(12) United States Patent
Song et al.

(10) Patent No.: US 9,176,664 B2
(45) Date of Patent: Nov. 3, 2015

(54) MOBILE TERMINAL AND CONTROLLING METHOD THEREOF

(75) Inventors: Yoomee Song, Seoul (KR); Yeerang Yun, Seoul (KR); Jaesik Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 150 days.

(21) Appl. No.: 13/492,764

(22) Filed: Jun. 8, 2012

(65) Prior Publication Data

US 2013/0141349 A1 Jun. 6, 2013

(30) Foreign Application Priority Data

Dec. 2, 2011 (KR) .................... 10-2011-0128047

(51) Int. Cl.
G06F 3/041 (2006.01)
G06F 3/0488 (2013.01)
G06F 21/36 (2013.01)

(52) U.S. Cl.
CPC ............ *G06F 3/04883* (2013.01); *G06F 21/36* (2013.01)

(58) Field of Classification Search
USPC ............ 713/100; 715/702; 455/566; 345/661
See application file for complete search history.

(56) References Cited

U.S. PATENT DOCUMENTS

| | | | |
|---|---|---|---|
| 2002/0116420 A1* | 8/2002 | Allam et al. .................. | 707/526 |
| 2009/0288032 A1* | 11/2009 | Chang et al. .................. | 715/776 |
| 2010/0146384 A1* | 6/2010 | Peev et al. ..................... | 715/255 |
| 2010/0159995 A1* | 6/2010 | Stallings et al. .............. | 455/566 |
| 2010/0269040 A1* | 10/2010 | Lee ............................... | 715/702 |
| 2010/0306705 A1 | 12/2010 | Nilsson | |
| 2011/0047368 A1* | 2/2011 | Sundaramurthy et al. .... | 713/100 |
| 2012/0032984 A1* | 2/2012 | Chen et al. .................... | 345/660 |

OTHER PUBLICATIONS

European Patent Office Application Serial No. 12004421.9, Search Report dated Nov. 23, 2012, 6 pages.

* cited by examiner

*Primary Examiner* — Dwayne Bost
*Assistant Examiner* — Chineyere Wills-Burns
(74) *Attorney, Agent, or Firm* — Lee, Hong, Degerman, Kang & Waimey

(57) ABSTRACT

A mobile terminal and controlling method thereof are disclosed. The present invention includes displaying an e-book content on a touchscreen, determining whether a touch lock prerequisite for setting the touchscreen to a touch lock mode is met, and if the touch lock prerequisite is met, setting the touchscreen to the touch lock mode. If the touchscreen is set to the touch lock mode, the touchscreen maintains a locked status for a touch action except a specifically provided touch action. And, the touchscreen set to the touch lock mode is set to display the e-book content.

20 Claims, 23 Drawing Sheets

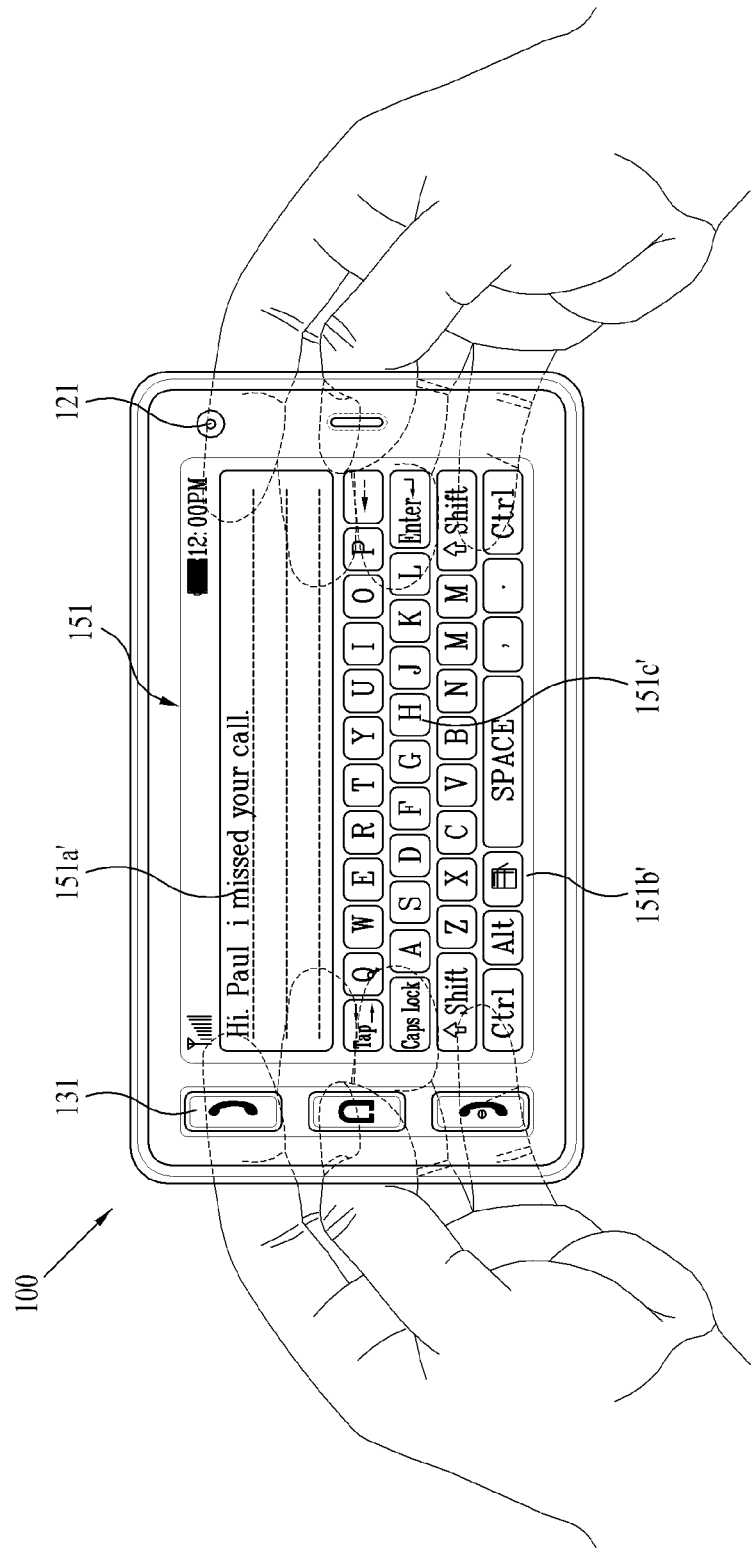

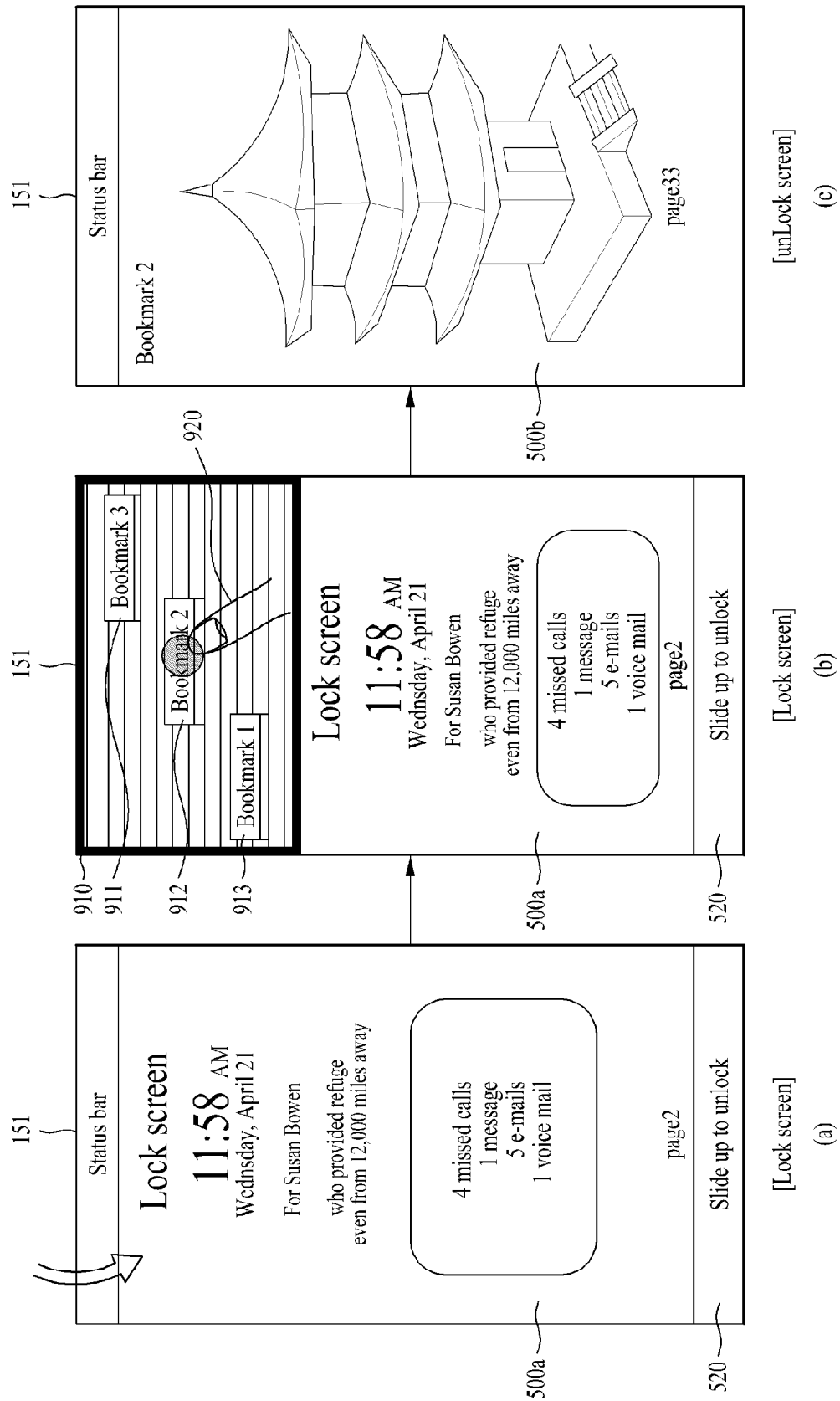

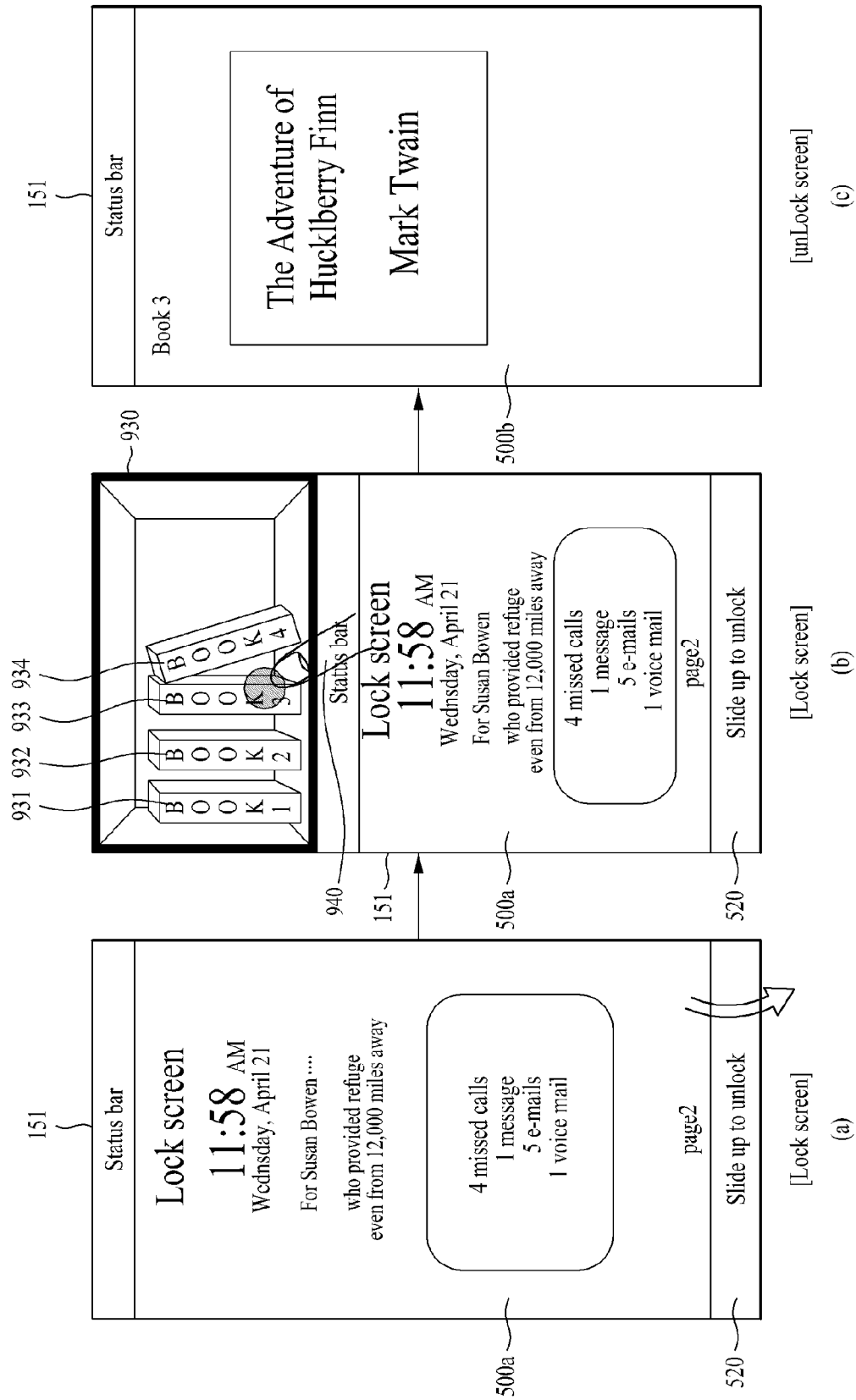

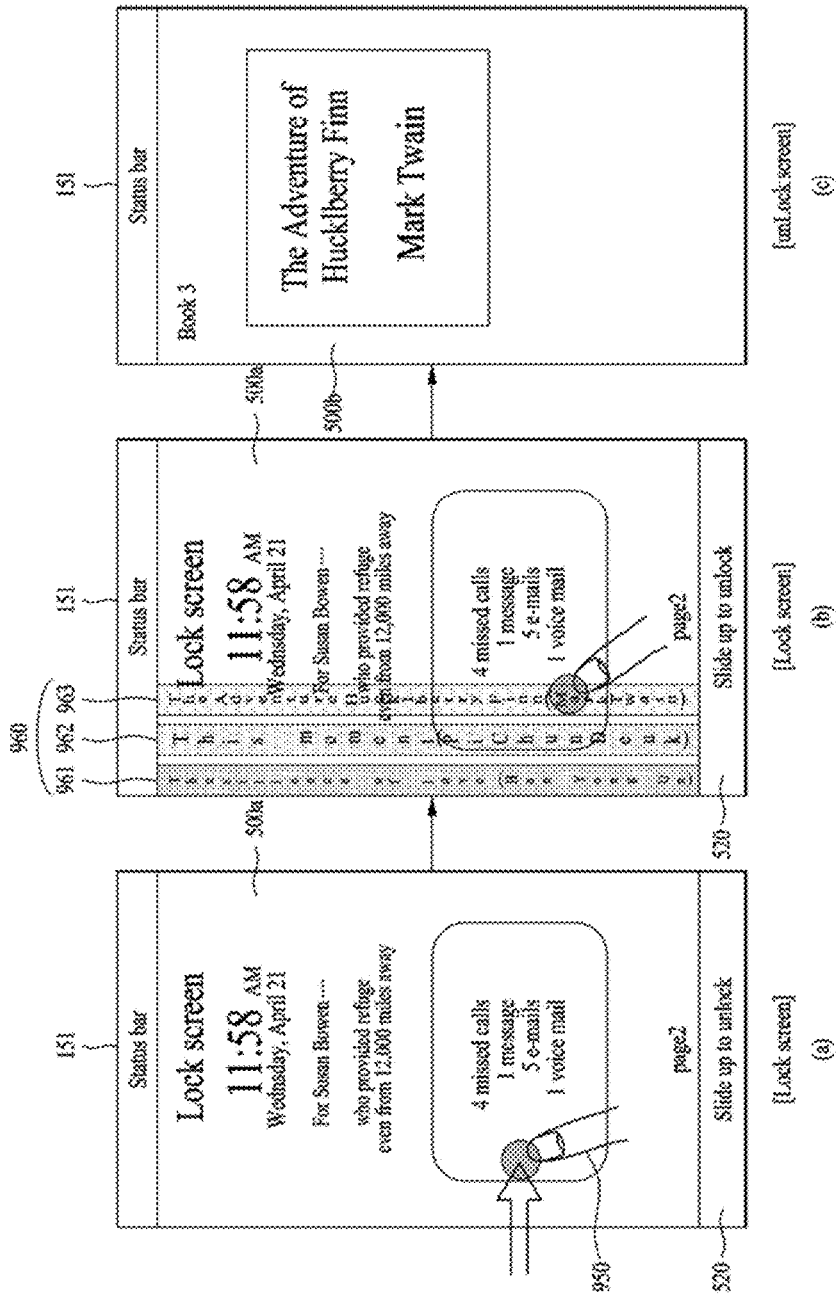

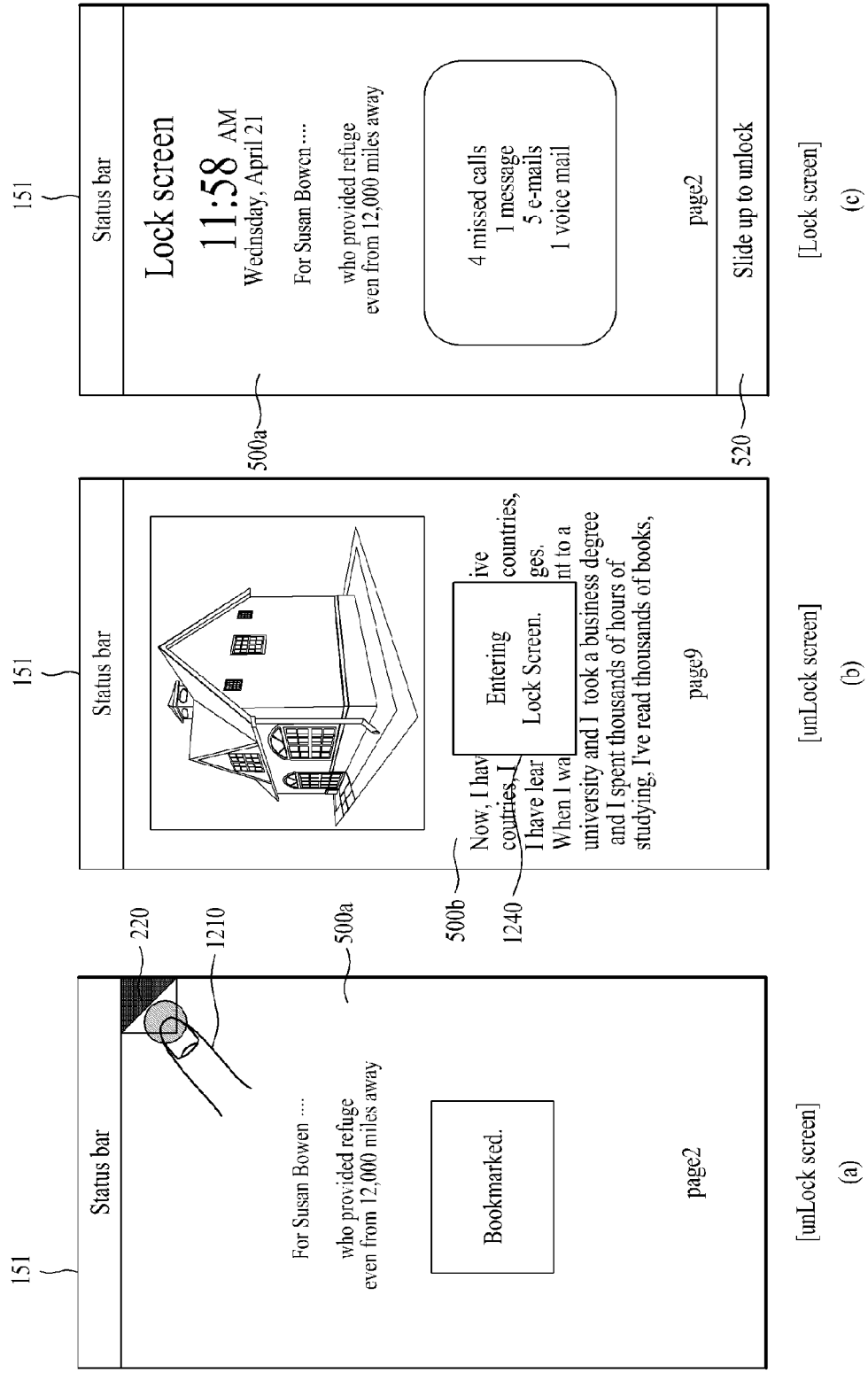

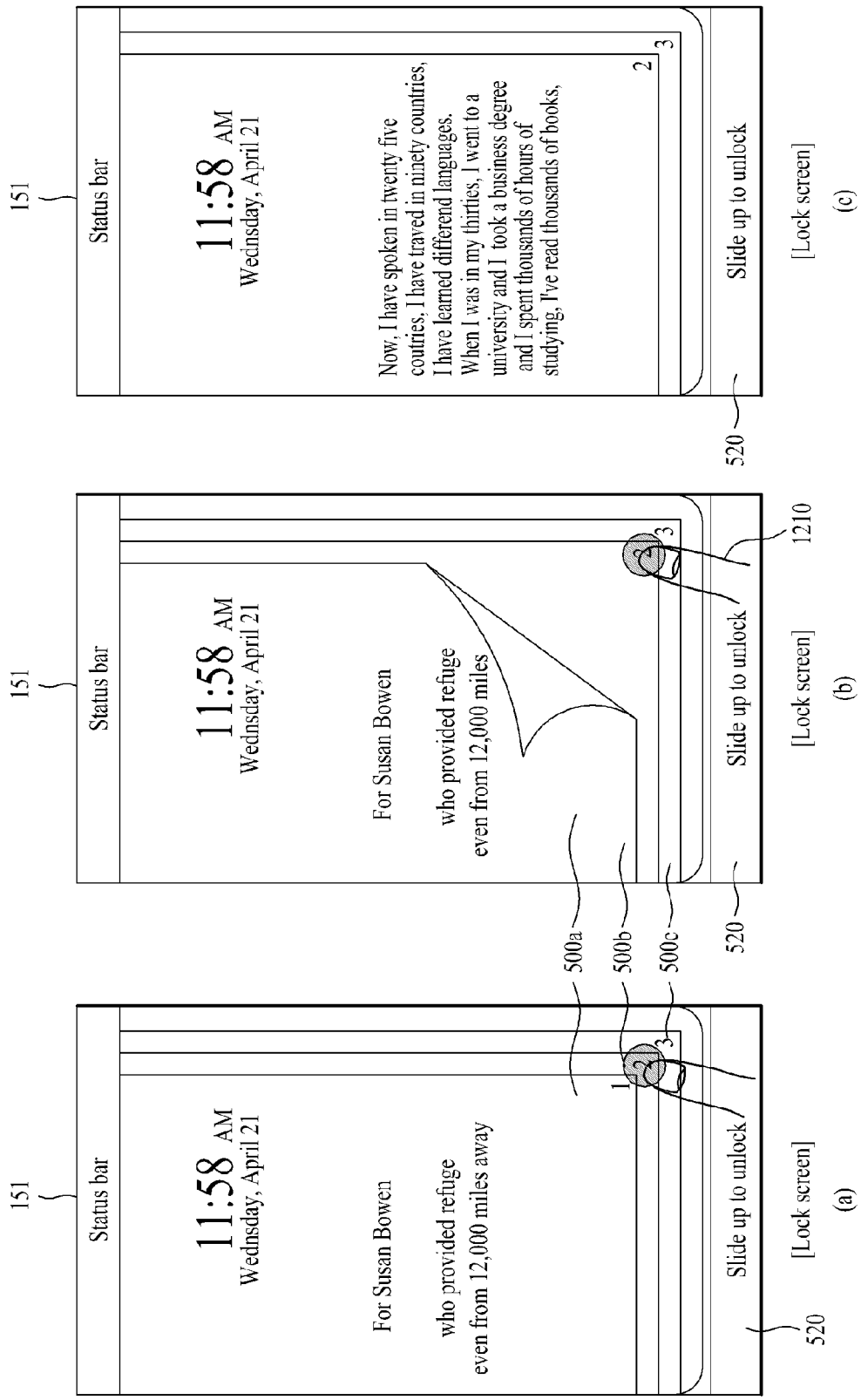

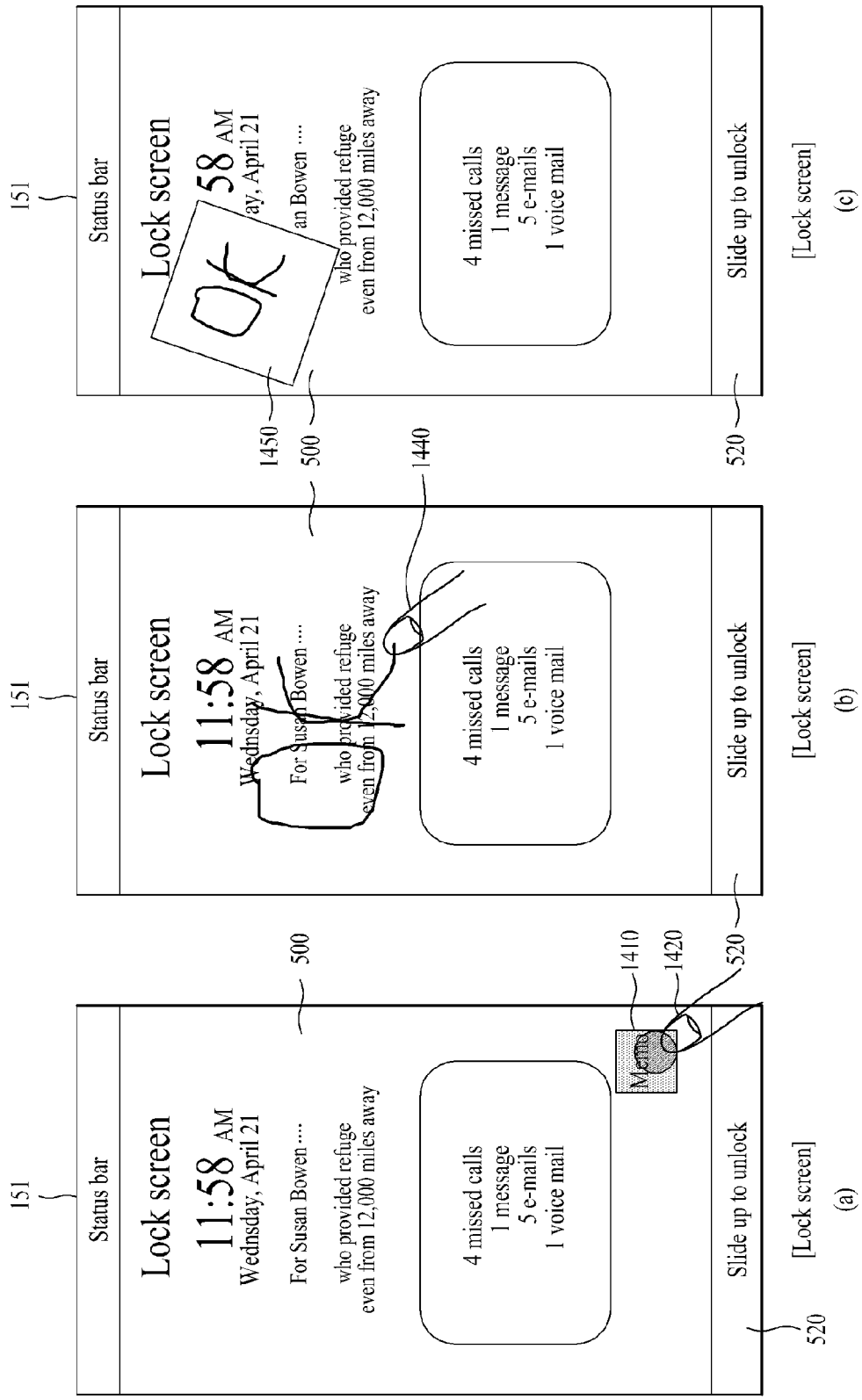

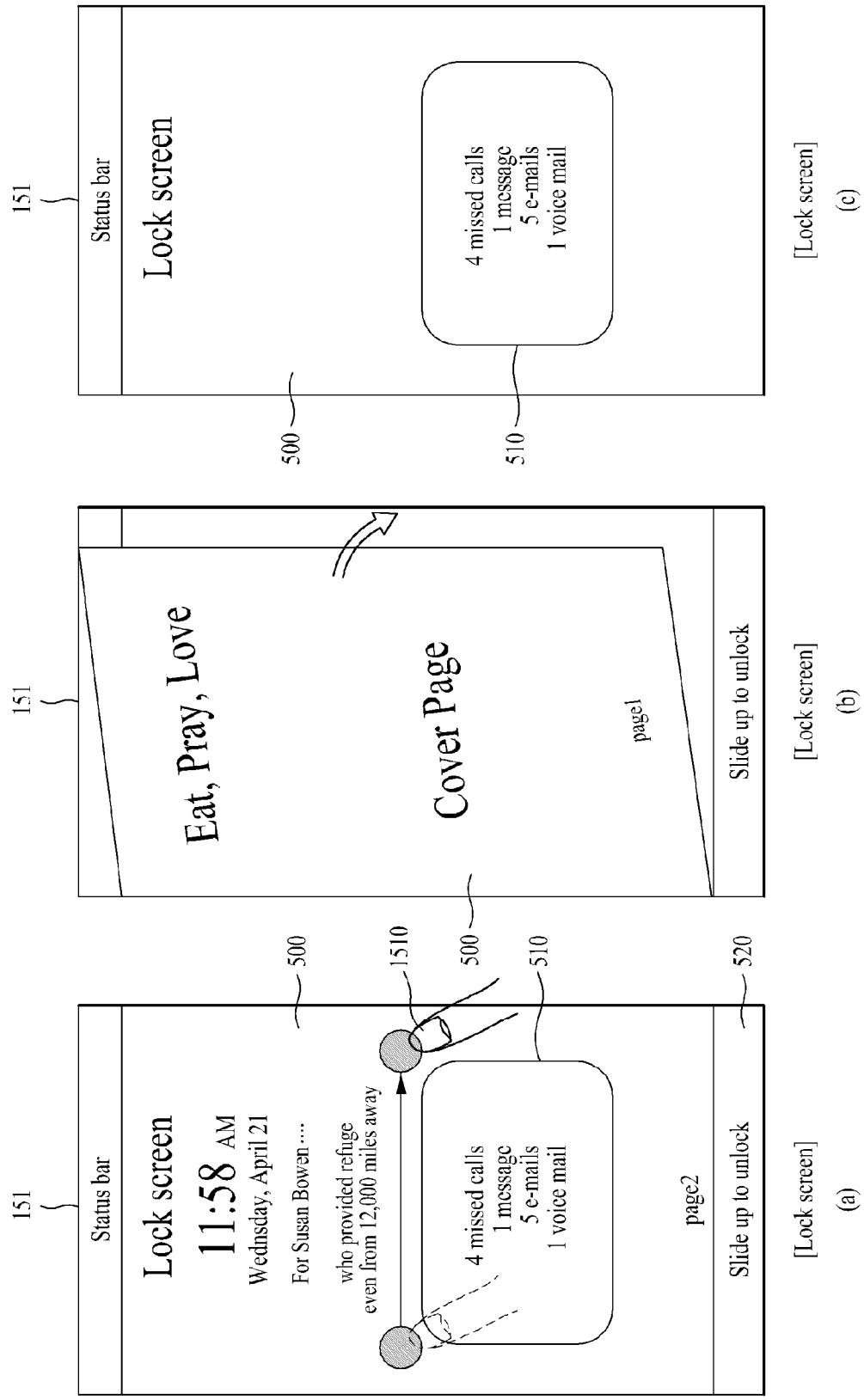

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2011-0128047, filed on Dec. 2, 2011, the contents of which are hereby incorporated by reference herein in its entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for displaying e-book (electronic book) contents in a touch lock mode.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Recently, if a display unit of a terminal and a sensor configured to sense a touch action configure a mutual layer structure (hereinafter named a touchscreen), the display unit may be usable as an input device as well as an output device. Compared to conventional input mechanism, a user's touch action via a touchscreen facilitates a user to control a mobile terminal in a desired direction. Yet, although a user unintentionally touches a touchscreen, a mobile terminal determines that there is a predetermined touch action performed by the user, it may perform an operation the user does not intend to do. Thus, if a user does not want to perform a touch action on a mobile terminal including a touchscreen, it may be necessary to set a mode of preventing a touch action from working, i.e., a screen lock mode or a touch lock mode. However, in case of a touch-locked mode of a conventional touchscreen, since basic information is available only, it may cause a problem that display functions of a mobile terminal have difficulty in being used fully and correctly.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which, when a touch lock mode is entered in the course of displaying an e-book content, the displayed e-book content is displayed in the touch lock mode.

Another object of the present invention is to provide a mobile terminal and controlling method thereof, by which a touch lock mode is canceled by a specific touch action in the course of displaying an e-book content in the touch lock mode and the e-book content is simultaneously displayed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a mobile terminal according to the present invention includes the steps of displaying e-book content comprising one or more pages on a touchscreen, determining whether a touch lock prerequisite for setting the touchscreen to a touch lock mode is met, and setting the touchscreen to the touch lock mode when the touch lock prerequisite is met, and maintaining the touchscreen in the touch lock mode until the touchscreen receives one or more specific touch actions to terminate the touch lock mode.

Preferably, the method further includes the steps of displaying a first page of the one or more pages of the e-book content while the touchscreen is set to the touch lock mode.

More preferably, the method further includes the steps of displaying a specific indicator corresponding to the first page of the one or more pages while the touchscreen is set to the touch lock mode, receiving an input of a touch action via the touchscreen to select the specific indicator, terminating the display of the specific indicator when the input of the touch action is received, terminating the touch lock mode when the input of the touch action is received, and displaying the one or more pages corresponding to the specific indicator when the touch lock mode is terminated.

More preferably, the specific indicator is at least a first indicator corresponding to a particular page of the one or more pages of the e-book content, a second indicator corresponding to a page preceding the particular page, or a third indicator corresponding to a page following the particular page.

More preferably, the specific indicator is a specific icon corresponding to a bookmarked page of the one or more pages of the e-book content. In this case, if the input of the touch action to select the specific icon is received via the touchscreen, the touchscreen is controlled to display the bookmarked page indicated by the specific icon.

More preferably, the method further includes the steps of displaying a memo icon on the touchscreen while the touchscreen is set to the touch lock mode, receiving an input of a touch action via the touchscreen to select the memo icon, terminating the display of the memo icon when the input of the touch action is received, activating a memo application corresponding to the selected memo icon when the input of the touch action is received, receiving an input of a user action via the memo application, the input of the user action comprising a writing of memo substance, and displaying the writing of memo substance on the touchscreen when the input of the user action is received.

Preferably, the method further includes the steps of displaying the first page of the one or more pages when the touch lock prerequisite is not met, and displaying a bookmarked second page of the one or more pages when the touch lock prerequisite is met.

Preferably, the touch lock prerequisite comprises at least not receiving an input of a touch action for a predetermined time duration or receiving a user command to set the touchscreen to the touch lock mode.

Preferably, the one or more specific touch actions to terminate the touch lock mode comprise one or more preset touch actions.

More preferably, the method further includes the steps of determining that the mobile terminal is positioned in a specific manner, and displaying a second page of the one or more pages as a result of the determination, wherein the second page is different from the first page.

More preferably, the method further includes the steps of displaying event information on the touchscreen while the touchscreen is set to the touch lock mode, wherein the event information comprises at least message caption information, call reception information or email reception information related to the touch lock mode.

In another aspect of the present invention, a mobile terminal includes a touchscreen configured to display e-book content comprising one or more pages, and a controller configured to: determine whether a touch lock prerequisite for setting the touchscreen to a touch lock mode is met, and set the touchscreen to the touch lock mode when the touch lock prerequisite is met, and maintain the touchscreen in the touch lock mode until the touchscreen receives one or more specific touch actions to terminate the touch lock mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 9A to 9C are diagrams for a $4^{th}$ example of displaying an e-book content by canceling a touch lock mode according to the present invention;

FIG. 12 is a diagram for one example of setting a bookmark and utilizing the bookmark in a touch lock mode according to the present invention;

FIG. 13 is a diagram for one example of an action of controlling an e-book content in a touch lock mode according to the present invention;

FIG. 14 is a diagram for another example of an action of controlling an e-book content in a touch lock mode according to the present invention; and FIG. 15 is a diagram for an action of ending an e-book content display according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
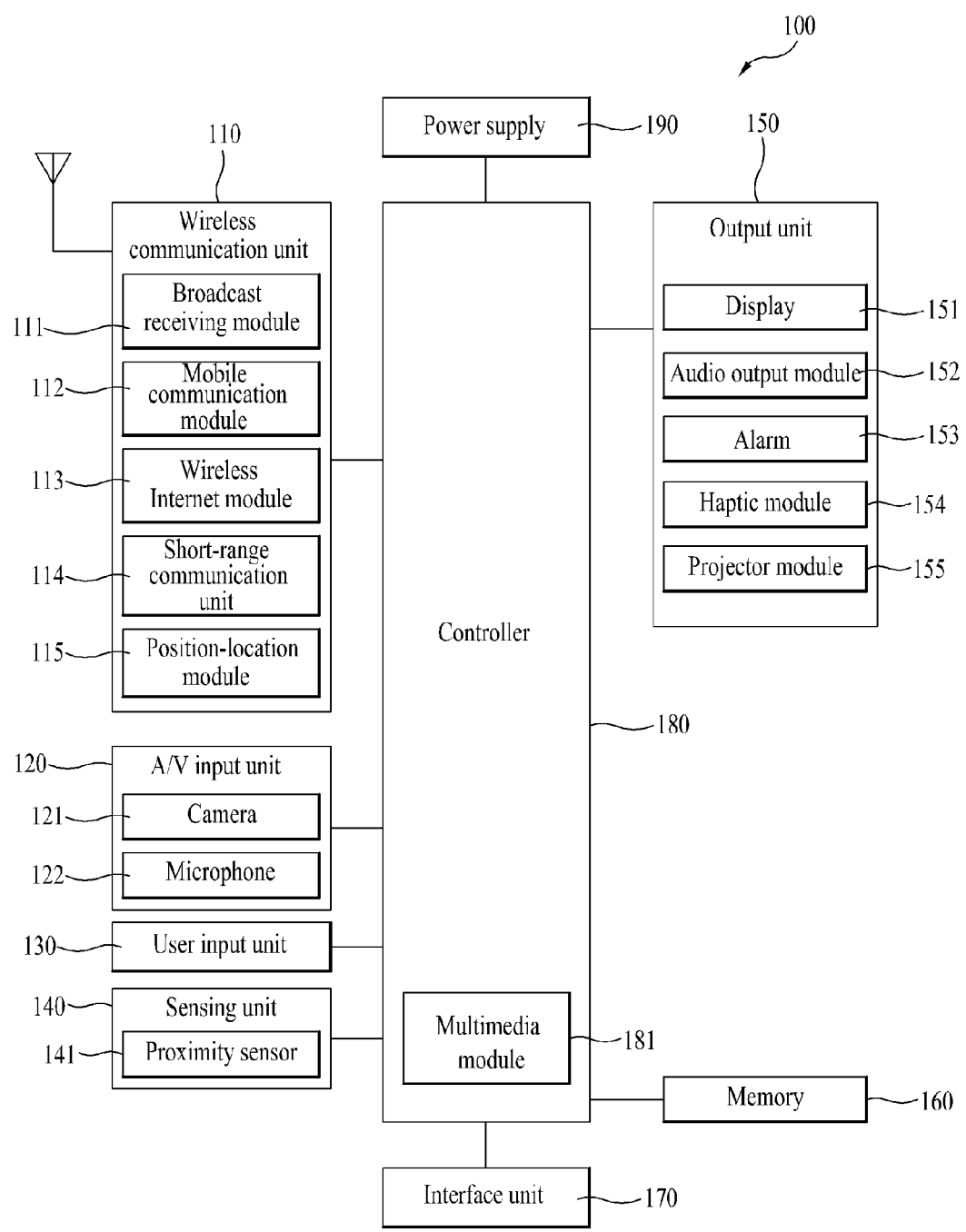
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
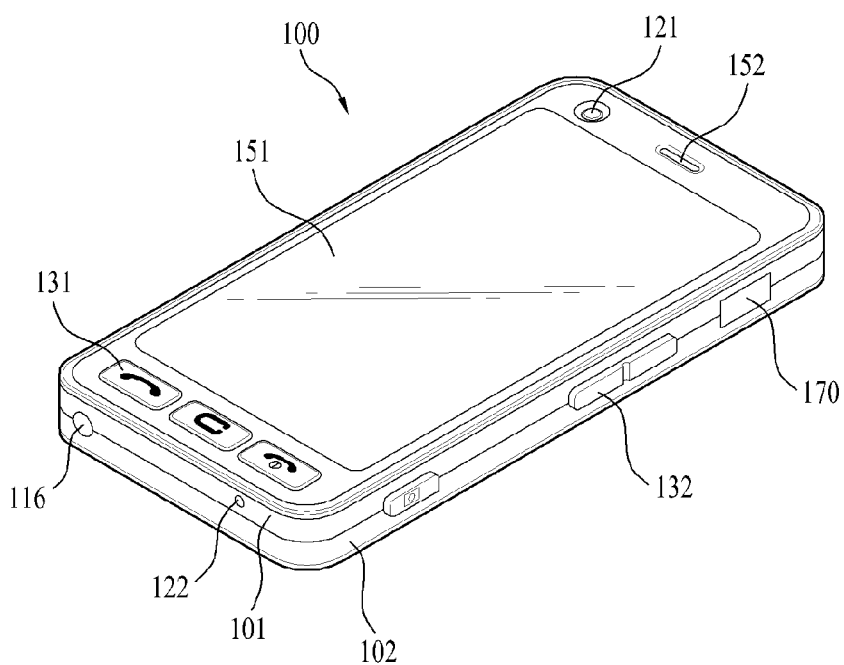
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
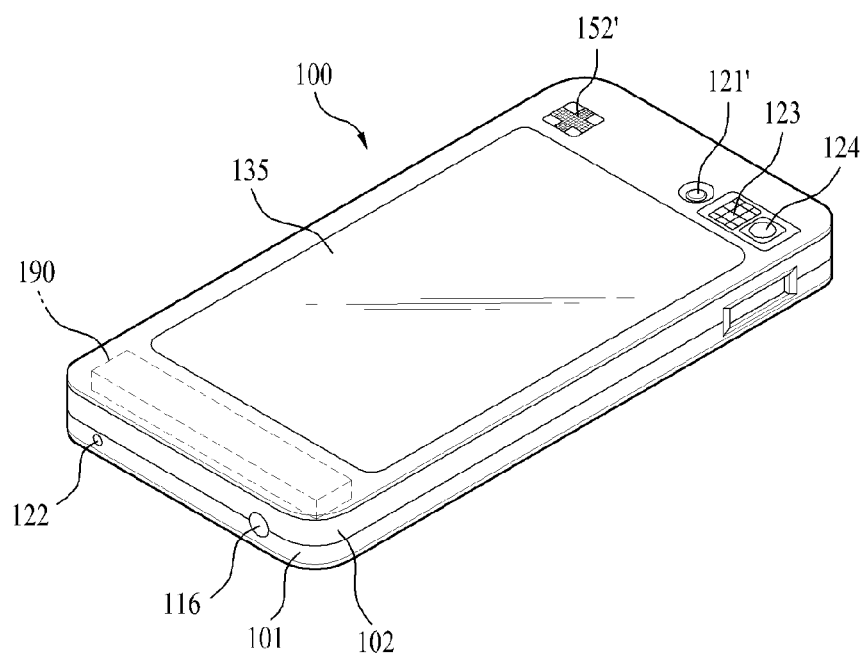
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

Interconnected operational mechanism between the display unit 151 and the touchpad 135 are explained with reference to FIG. 3 as follows.

Figure 3A:
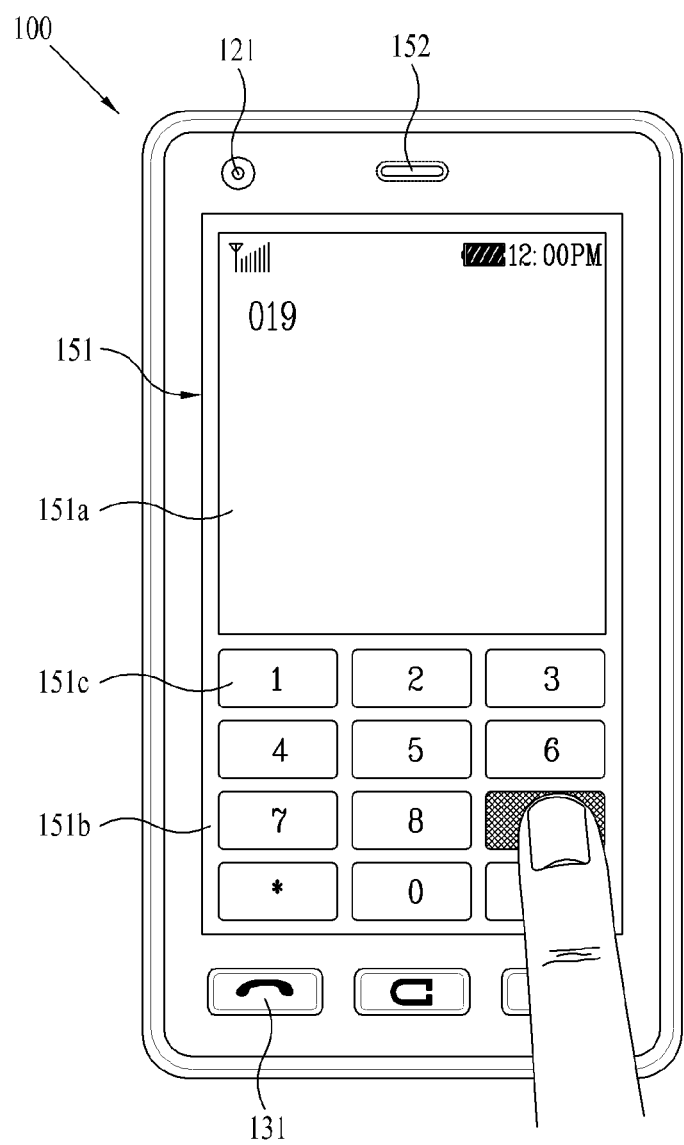
FIG. 3 is front diagram of a mobile terminal according to one embodiment of the present invention for explaining one operational status of the mobile terminal.

FIG. 3 is front-view diagram of a terminal according to one embodiment of the present invention for explaining an operational state thereof.

First of all, various kinds of visual information can be displayed on the display unit 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

For clarity and convenience, a mobile terminal mentioned in the following description may include at least one of the components shown in FIG. 1.

First of all, an e-book content may be displayed on the touchscreen 151 of the present invention. Regarding the e-book content, the mobile terminal 100 according to the present invention may be equipped with a function of displaying an e-book content. An electronic book (hereinafter abbreviated e-book) may mean a digital book usable as a paper book in a manner of recording such information as characters, images and the like in an electronic medium. In aspect of a user, it is convenient and advantageous in that the e-book is less expensive than a paper book and that a necessary portion of the e-book can be separately purchased. In aspect of a publisher, it is advantageous in that the e-book can save costs for publication and distribution and that the e-book can be easily updated.

According to the e-book, contents of writings published into a paper book or contents of possibly-published writings are recorded in an electronic recording medium and may be then read or viewed using a computer or a mobile terminal via wired/wireless communication network. And, the e-book content may mean a file containing contents of the e-book. Since the e-book content is written using digital data of a paper book, it may be able to include a content consisting of a plurality of pages like a paper book. Regarding a method of displaying an e-book content on the mobile terminal 100, all pages constructing an e-book content may be displayed on a display screen of the touchscreen 151 at a time or a prescribed one of the pages constructing the e-book content can be displayed on the display screen only.

Figure 4:
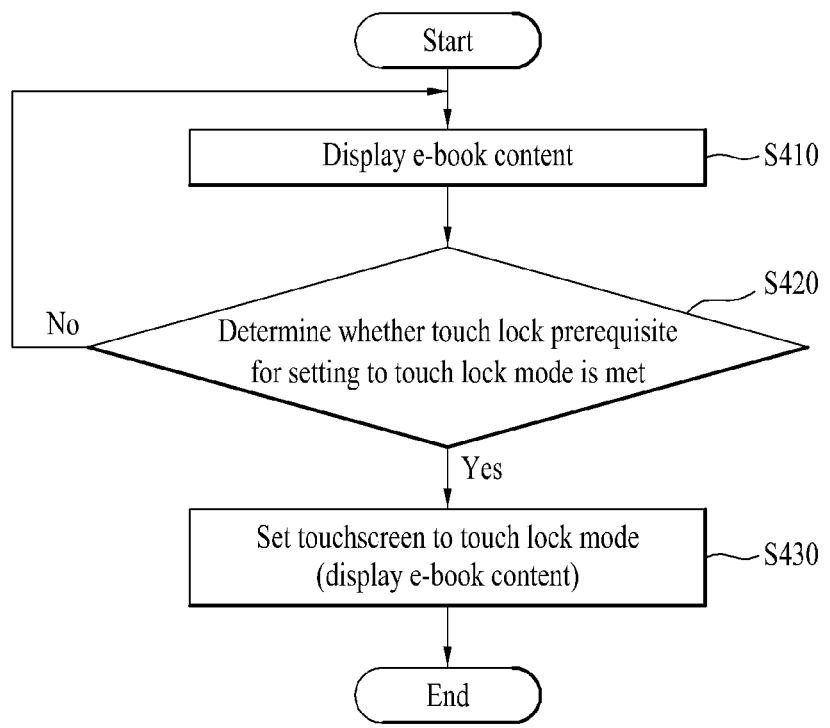
FIG. 4 is a flowchart for a method of controlling a mobile terminal according to the present invention.

FIG. 4 is a flowchart for a method of controlling a mobile terminal according to the present invention.

Referring to FIG. 4, an e-book content is displayed on the touchscreen [S410]. While the e-book content is displayed, the controller 180 determines whether it corresponds to a touch lock prerequisite to set the touchscreen 151 to enter a touch lock mode [S420]. If the controller 180 determines that it corresponds to the touch lock prerequisite, the controller 180 sets the touchscreen 151 to enter the touch lock mode while displaying the e-book content [S430].

The terminology 'touch lock mode' used in this specification may mean a mode in which predetermined limitation is put on the touchscreen 151 in receiving a touch action. According to a setting, the touchscreen 151 in the touch lock mode may not receive every touch action from a user as a meaningful user command. Optionally, although the touchscreen 151 in the touch lock mode is determined as a specifically provided touch action, it may not determine other touch actions as meaningful user commands.

In the following description, examples of displaying an e-book content by setting a touch lock mode according to embodiments of the present invention are explained with reference to FIGS. 5A to 15.

Figure 5A:
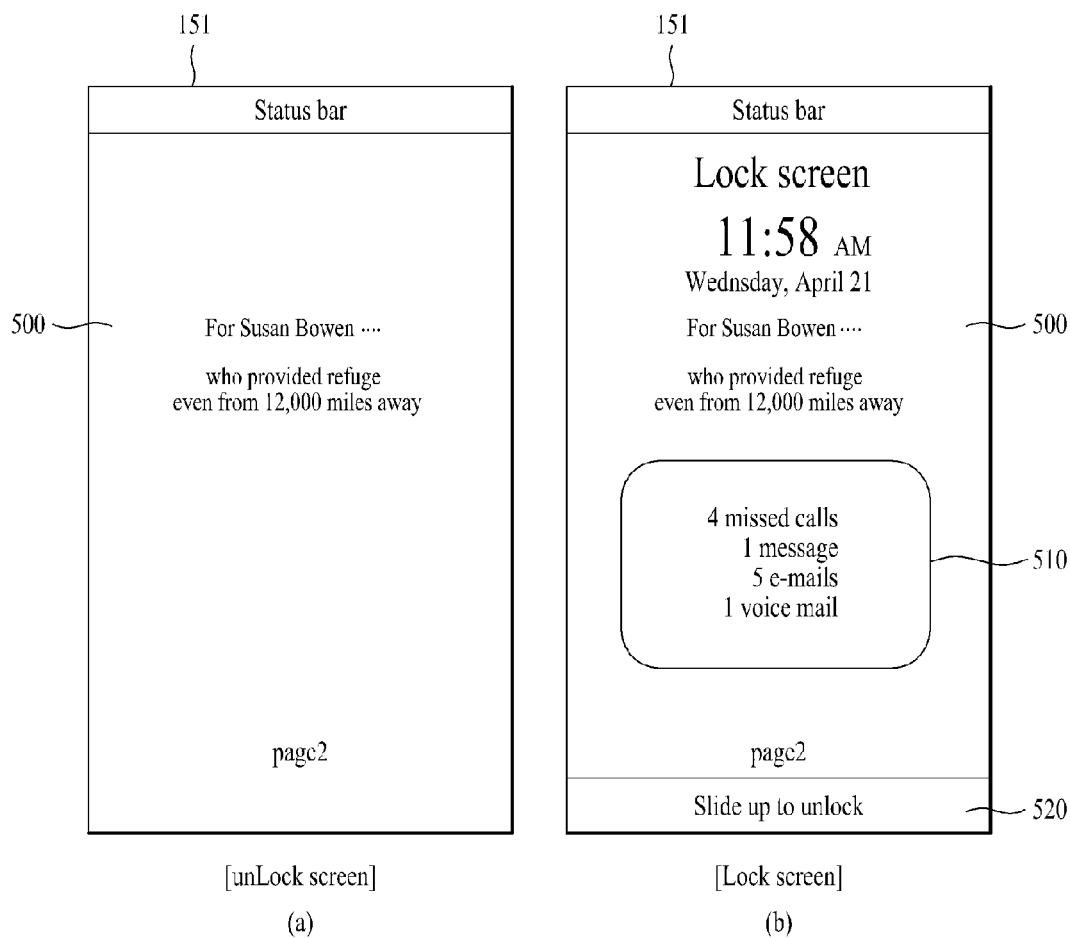
FIG. 5A and FIG. 5B are diagrams for entering a touch lock mode by a touch lock mode entering action according to the present invention.

FIG. 5A is a diagram for entering a touch lock mode according to the present invention.

Referring to FIG. 5A (a), a specific e-book content is displayed on the touchscreen 151. In doing so, the touchscreen 151 is currently in screen unlock mode, which is not in screen lock mode. Hence, if the touchscreen 151 receives a touch action from a user, the controller 180 may be able to perform a control operation corresponding to the received touch action. In this case, an image displayed on the touchscreen 151 may include a specific page of the e-book content 500. Since the mobile terminal 100 of the present invention is equipped with an e-book reader function, e-book contents can be read and then displayed on the touchscreen 151. In particular, for example, a specific page (i.e., page 2) of a specific English novel is displayed on the touchscreen 151 shown in FIG. 5A (a).

Referring to FIG. 5A (b), the touchscreen 151 is in touch lock mode, i.e., screen lock mode. The controller 180 keeps determining whether the touchscreen 151 meets a touch lock prerequisite. If the touch lock prerequisite is met, the controller 180 sets the touchscreen 151 to enter the touch lock mode. In case that the touchscreen 151 enters the touch lock mode, it may display the figure shown in FIG. 5A (b).

The touch lock prerequisite is a necessary condition that is required in case of setting the touchscreen 151 to enter the touch lock mode to prevent the mobile terminal 100 from malfunctioning due to an unnecessary touch action performed on the touchscreen 151. For instance, the controller 180 may determine that the touch lock prerequisite is met in case that the mobile terminal 100 receives any touch action or user action from a user for predetermined duration (e.g., 10 seconds, etc.), that a user directly gives a command for entering a touch lock mode using a touch action or such a user action as a touch lock mode setting menu selecting action and the like, or that power of the mobile terminal 100 is lowered down to a specific level (e.g., 5%) or lower.

Once the touch lock mode is set, the touchscreen 151 puts predetermined limitation on a user touch action and may not determine a user touch action as a meaningful user command except specific touch actions. For instance, the specific touch actions may include a touch to a specific position as a previously provided action to cancel the touch lock mode, a touch & drag action in specific pattern, and the like. In order to cancel the touch lock mode, a special touch action for the touch lock cancellation may not be required all the time. For example, it may be able to set the touch lock mode to be cancelled by pressing a specific button.

Although the touchscreen 151 is in touch lock mode, it may be able to keep displaying specific information. For instance, despite that the touchscreen 151 is in the screen lock mode, it may be able to display such information occurring in the mobile terminal 100 as information indicating that the touch lock mode is entered, information on a call received in the touch lock mode, information on an email received in the touch lock mode, information on a message received in the touch lock mode and the like.

The mobile terminal 100 according to the present invention may be able to display an e-book content on the touchscreen 151 in the touch lock mode.

While the e-book content is displayed, as shown in FIG. 5A (a), if the touch lock prerequisite is met as a provided time is over, the touchscreen enters the touch lock mode. In doing so, the touchscreen 151 may be able to display an e-book content 500 displayed at the timing point of entering the touch lock mode. In particular, although predetermined limitation is put on a touch input to the touchscreen 151 due to the entered touch lock mode, the e-book content may be displayed in the touch lock mode as it is.

Referring now to FIG. 5A (b), while 'Lock Screen' indicating the touch lock mode is displayed on the touchscreen 151, the e-book content 500 displayed in FIG. 5A (a) is displayed as well. Referring to the drawings related to the present invention as well as FIG. 5A (b), in the touch lock mode, 'Lock Screen' indicating the entered touch lock mode, current time information and event information on an event occurring in the mobile terminal 100 can be displayed together with the e-book content 500.

Figure 5B:
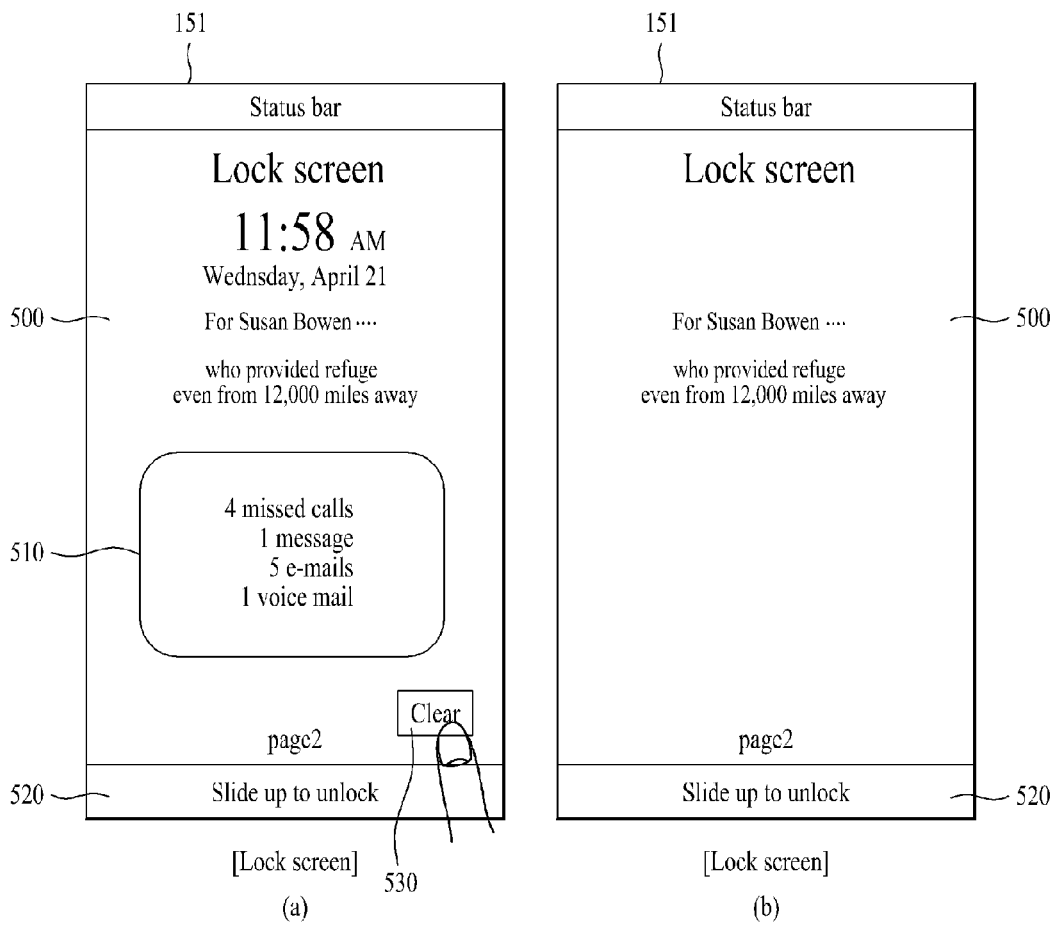

FIG. 5B shows a status that an e-book content is displayed only if a touch lock mode is entered.

Referring to FIG. 5B (a), in a manner similar to that shown in FIG. 5A (b), after a touch lock mode has been entered, an e-book content is displayed in the touch lock mode. In doing so, a menu 'clear' 530 may be displayed on the touchscreen 151 together with the e-book content. In particular, the clear menu 530 may be set as a region in which a user's touch action is possible despite the entered touch lock mode. If the clear menu 530 is selected, various information used to be displayed in the touch lock mode shown in FIG. 5A (b) disappear from the touchscreen 151 but the e-book content 500 may be displayed only.

Referring to FIG. 5B (b), if the clear menu 530 is selected in FIG. 5B (a), the e-book content 500 is displayed only in the touch lock mode. In particular, in order to indicate the entered touch lock mode, an indication 'Lock Screen' is displayed, which is optional. Instead, the e-book content 500 may be displayed only without the indication 'Lock Screen'.

Meanwhile, in FIG. 5A or FIG. 5B, an unlock menu 520 is displayed on a bottom end of the touchscreen 151 if a touch lock mode is entered. In this case, the unlock menu 520 is the menu for canceling the touch lock mode and may be set as a region available for a user touch. Hence, if the unlock menu 520 is selected in FIG. 5B (b), the controller 180 may control the touch lock mode of the touchscreen 151 to be cancelled despite that the e-book content 500 keeps being displayed on the touchscreen 151.

Meanwhile, the e-book content displayed in the touch lock mode may be set in various ways. For instance, a specific page (e.g., $1^{st}$ page, e-book cover page, etc.) may be set to be displayed only or a last page at the timing point of setting the touch lock mode may be displayed only. In the drawing, the last page at the timing point of setting the touch lock mode is displayed as the e-book content 500 on the touchscreen 151.

In the following description, examples of displaying an e-book content by canceling a touch lock mode of the touchscreen 151 according to various embodiments of the present invention are explained with reference to FIGS. 6 to 100.

Figure 6:
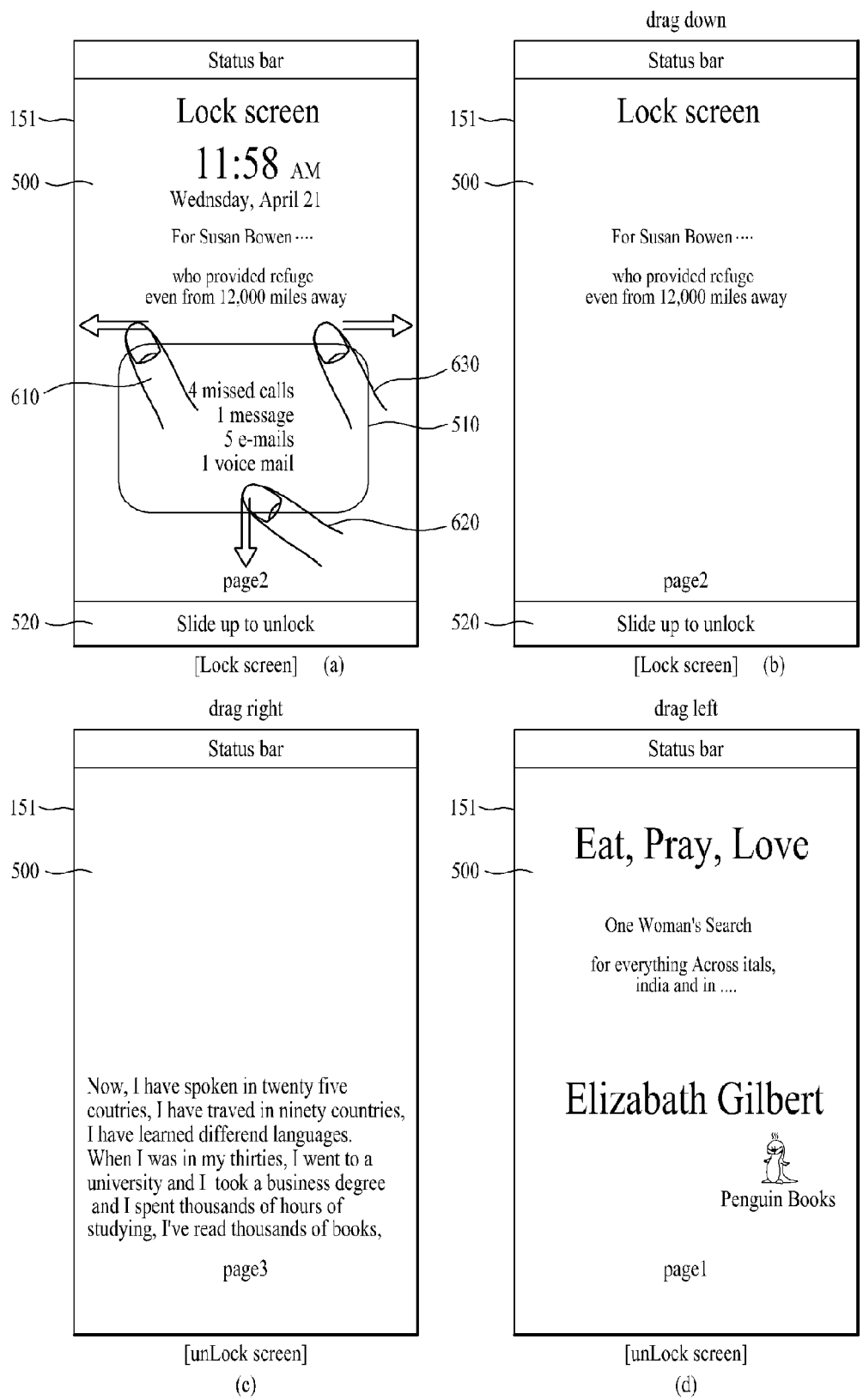
FIG. 6 is a diagram for a $1^{st}$ example of displaying an e-book content by canceling a touch lock mode according to the present invention.

FIG. 6 is a diagram for a $1^{st}$ example of displaying an e-book content by canceling a touch lock mode according to the present invention.

Referring to FIG. 6A (a), an e-book content is displayed on the touchscreen 151 in a touch lock mode. In particular, $2^{nd}$ page among a plurality of pages constructing the e-book content is displayed as a current page on the touchscreen 151 and various kinds of information indicating the entered touch lock mode are displayed together as well.

A touch & drag action in a specific direction is described as one method of canceling a touch lock mode with reference to FIG. 6 (a) as follows. First of all, the controller 180 may be able to set a specific drag action on a specific region to be recognized in a touch lock mode. For instance, although the touchscreen 180 may be able to recognize all touch actions from a user, it may be set to respond to a touch & drag action in a specific direction only in the touch lock mode. FIG. 6 (a) shows a touch & drag action 610 in right-to-left direction, a touch & drag action 620 in top-to-bottom direction, and a touch & drag action 630 in left-to-right direction. For example, if one of the 3 kinds of touch & drag actions is inputted to the touchscreen 151 by a user, the controller 180 may be able to recognize the inputted touch & drag action as a user command for changing substance displayed on the touchscreen 151 or a user command for canceling the touch lock mode. For instance, if the touch & drag action 610 in the right-to-left direction or the touch & drag action 620 in the left-to-right direction is inputted, the content of the page of the e-book content may be changed as soon as the touch lock mode is canceled. If the touch & drag action 620 in the bottom direction is inputted, the substance of the e-book content can be set to be displayed only.

Referring to FIG. 6 (b), if the touch & drag action 620 in the top-to-bottom direction is inputted, the touchscreen 151 may be able to display a current page used to be displayed in the touch lock mode only. In doing so, the touch lock mode may be set as it is. If the touch & drag action 620 in the top-to-bottom direction is inputted, the information 510 of the mobile terminal 100 used to be provided in the touch lock mode and the time information are removed and a current page substance of the e-book content may be displayed only. In particular, if the current page of the e-book content is concentrated in the touch lock mode, the mobile terminal 100 may be able to provide a status that a desired current page of the e-book content is readable by the touch & drag action in the top-to-bottom direction.

Meanwhile, if an unlock menu 520 is selected in FIG. 6 (b), the touchscreen 151 may be able to intactly display $2^{nd}$ page, which is a current page, as soon as the touch lock mode is canceled.

Meanwhile, if the touch & drag action in the top-to-bottom direction is inputted, unlike FIG. 6 (b), information on the e-book content may be displayed optionally. In particular, if the touch & drag action in the top-to-bottom direction is inputted, the touchscreen 151 maintains the touch lock mode and may be also able to display additional information related to a total number of whole pages, title, author, publisher and the like as information on the currently displayed e-book content.

Referring to FIG. 6 (c), the touch & drag action 630 in the left-to-right direction is inputted. If the touch & drag action in the left-to-right direction is performed, the touchscreen 151 may be released from the touch lock mode. Moreover, as soon as the touch lock mode is canceled, a page next to a previously displayed page can be displayed. In particular, in the drawing, the touchscreen 151 is released from the touch lock mode and $3^{rd}$ page next to the $2^{nd}$ page displayed in the touch lock mode is displayed.

Referring to FIG. 6 (d), the touch & drag action 610 in the right-to-left direction is inputted. Although the right-to-left touch & drag action 610 cancels the touch lock mode in the same manner of the left-to-right touch & drag action 630, the right-to-left touch & drag action 610 and the left-to-right touch & drag action 630 differ from each other in substance of the displayed page. In particular, if the right-to-left touch & drag action 610 is inputted, the touchscreen 151 is released from the touch lock mode and the $1^{st}$ page previous to the $2^{nd}$ page displayed in the touch lock mode is displayed on the touchscreen 151.

Meanwhile, in order to change the substance displayed on the touchscreen 151 or cancel the touch lock mode, an arrow menu in specific direction may be displayed on the touchscreen 151 as well as the above-mentioned touch & drag action in specific direction. For instance, if a left arrow menu, a right arrow menu and a bottom arrow menu may be displayed on the touchscreen 151, a user may be able to select one of the arrow menus. If a specific arrow menu is selected from the displayed arrow menus, it may be handled as the case of receiving an input of a touch & drag action corresponding to a specific arrow direction. For instance, if the left arrow menu is selected, a page previous to a former page displayed in the touch lock mode may be displayed as soon as the touch lock mode is canceled, in the same manner shown in FIG. 6 (d). Optionally, the above-mentioned arrow menus may be set to be displayed if a user performs a specific action (e.g., a touch to a vacant screen of a lock region).

Figure 7:
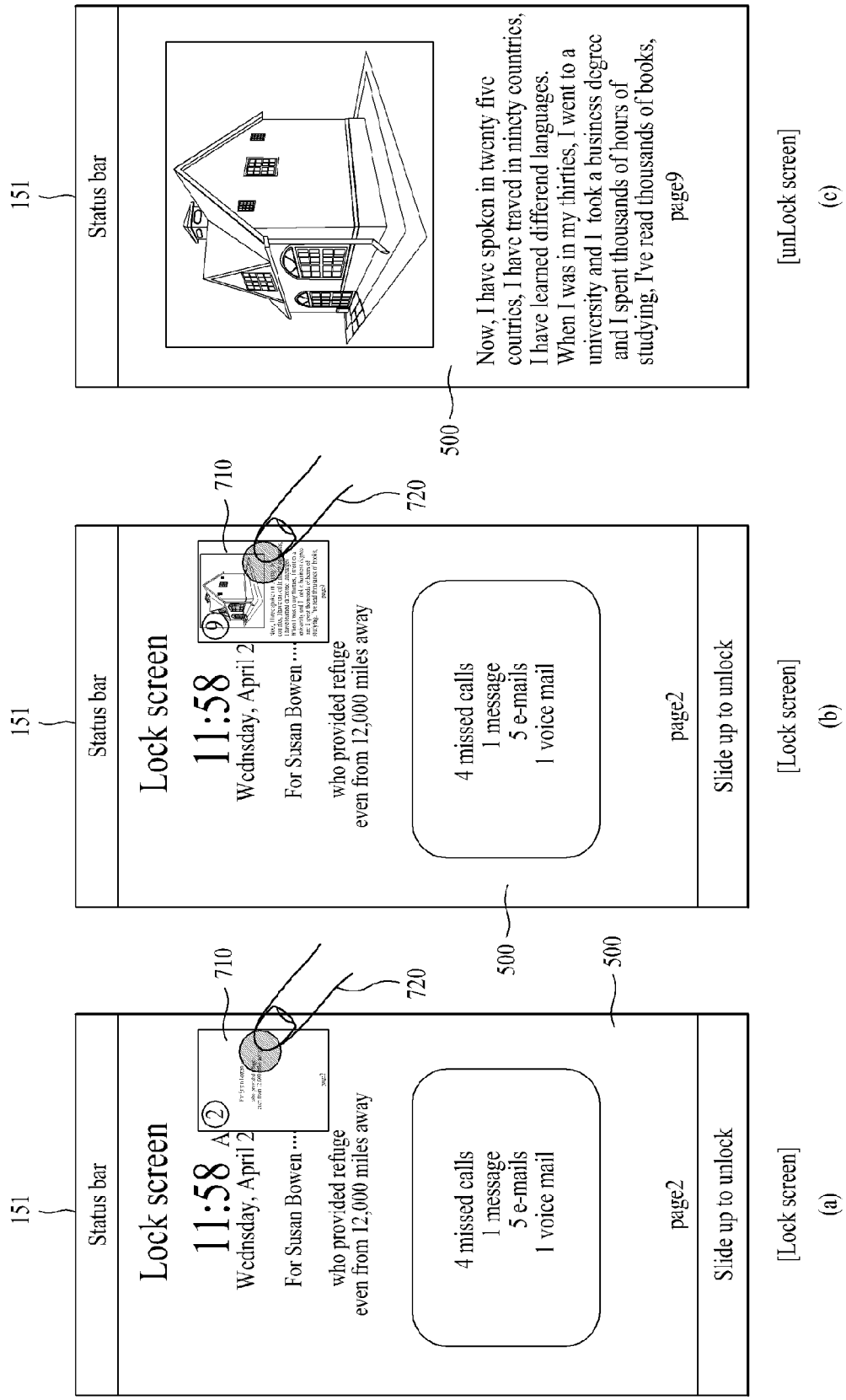
FIG. 7 is a diagram for a $2^{nd}$ example of displaying an e-book content by canceling a touch lock mode according to the present invention.

FIG. 7 is a diagram for a $2^{nd}$ example of displaying an e-book content by canceling a touch lock mode according to the present invention.

According to the present invention, the touchscreen in a touch lock mode may be able to display a preview window 710 in which an e-book content displayed on the touchscreen 151 is displayed by being reduced into a small size. In particular, the touch lock mode may be cancelled as well as the e-book content is displayed in small size, via the preview window 710.

Referring to FIG. 7 (a), while an e-book content is displayed on the touchscreen 151 in a touch lock mode, a preview window 710 for displaying a reduced e-book content is displayed on the touchscreen 151. In doing so, the preview window 710 may be set to be always displayed in the touch lock mod. Alternatively, the preview window 710 may be displayed only if selected by a user. Moreover, the preview window 710 may display a current page of a currently displayed e-book content 500. In the drawing, the preview window 710 may display $2^{nd}$ page that is the current page of the currently displayed e-book content 500. If a user touches the preview window 710, the touch lock mode may be canceled or a currently displayed page may be optionally changed.

Referring to FIG. 7 (b), if a user keeps touching the preview window 710, the $2^{nd}$ page displayed on the preview window 710 shown in FIG. 7 (a) is changed into $9^{th}$ page. In particular, pages may be turned in proportion to a time of a user touch to the preview window 710. For instance, if the preview window 710 is touched during 2 seconds, $2^{nd}$ page may be turned to $7^{th}$ page. For another instance, if the preview window 710 is touched during 4 seconds, $2^{nd}$ page may be turned to $12^{th}$ page. In doing so, the preview window 710 may display the page number of the page currently displayed by being reduced. While the $2^{nd}$ page keeps being displayed on a full screen of the touchscreen 151, another page (e.g., $9^{th}$ page) may be displayed on the preview window 710 in response to a touch action performed on the preview window 710. Optionally, if a page displayed on the preview window 710 is changed in a manner of having a user keep touching the preview window 710, the controller 180 may set the page, which is displayed on the full screen of the touchscreen 151, to be changed together with the changed page in the preview window 710. In particular, a page of an e-book content displayed on the touchscreen 151 in a touch lock mode may be changed in a manner of touching the preview window 710.

Referring to FIG. 7 (c), if the preview window 710 is touched, the touch lock mode may be cancelled. When the $9^{th}$ page is currently displayed on the preview window 710, as shown in FIG. 7 (b), if the touch action on the preview window 710 is ended, the controller 180 recognizes it as a user action to cancel the touch lock mode and then cancels the touch lock mode. And, the controller 180 controls the touchscreen 151 to display the page used to be displayed on the preview window 710.

Figure 8:
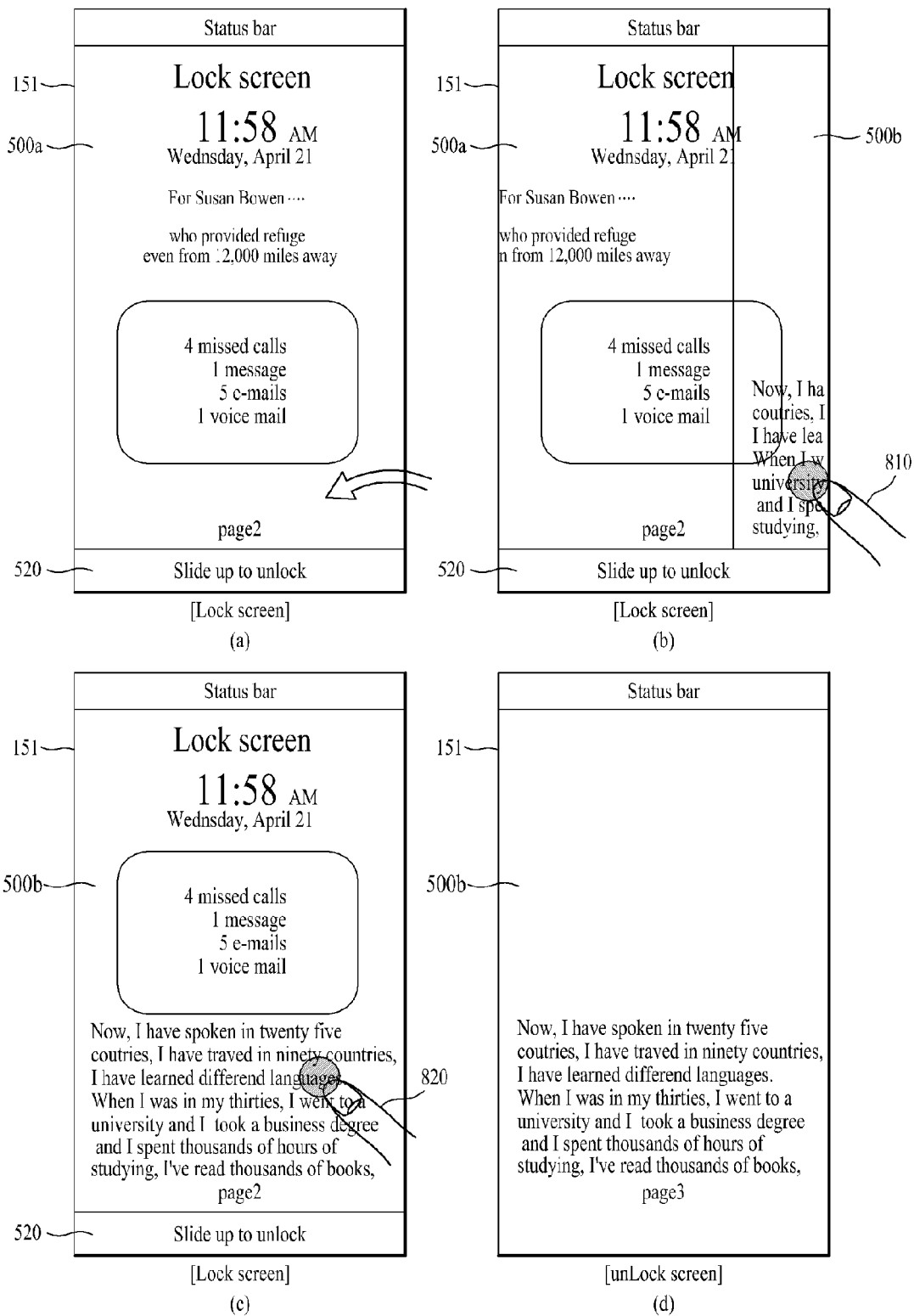
FIG. 8 is a diagram for a $3^{rd}$ example of displaying an e-book content by canceling a touch lock mode according to the present invention.

FIG. 8 is a diagram for a $3^{rd}$ example of displaying an e-book content by canceling a touch lock mode according to the present invention.

Referring to FIG. 8 (a), the touchscreen 151 is in a touch lock mode. A specific page (i.e., $2^{nd}$ page) is displayed on the touchscreen 151. Meanwhile, an arrow shown in FIG. 8 (a) schematically represents an action of inclining the mobile terminal 100 in right-to-left direction. The mobile terminal 100 may be able to determine a degree of inclination of the mobile terminal 100 using the sensing unit 140. Hence, if the mobile terminal 100 is inclined in specific direction, as shown in the drawing, the controller 180 may determine it as a meaningful user action.

Referring to FIG. 8 (b), an action of inclining the mobile terminal 100 in lateral direction is performed. The controller 180 confirms the lateral inclination action of the mobile terminal 100 via the sensing unit 140 and may be then able to change a status of a displayed page by maintaining the touch lock mode. In the drawing, if the mobile terminal 100 is inclined in lateral direction, $3^{rd}$ page 500b next to $2^{nd}$ page 200a may be set to be displayed in part. If a user selects the $3^{rd}$ page 500b displayed in part, the $3^{rd}$ page 500 may be set to be displayed.

Referring to FIG. 8 (c), if the $3^{rd}$ page 500b displayed in part is selected, the $3^{rd}$ page 500b may be fully displayed on the touchscreen 151. Meanwhile, if the fully displayed $3^{rd}$ page 400 is selected by a user touch action 820, the controller 180 recognizes that a prescribed touch unlock action is inputted and may be then able to cancel the touch lock mode.

Referring to FIG. 8 (d), if the touch lock mode is cancelled by the user action shown in FIG. 8 (c), the $3^{rd}$ page 500 keeps being displayed on the touchscreen 151.

FIGS. 9A to 9C are diagrams for a $4^{th}$ example of displaying an e-book content by canceling a touch lock mode according to the present invention.

FIG. 9A shows a diagram of canceling a touch lock mode in a manner of selecting one of various bookmark indicators.

Referring to FIG. 9A (a), an e-book content of a $2^{nd}$ page 500a, which is a specific page, is displayed on the touchscreen 151 in a touch lock mode. Meanwhile, an arrow shown in FIG. 9A (a) means an action of inclining the mobile terminal 100 in top direction.

Referring to FIG. 9A (b), if the mobile terminal 100 is inclined in the top direction, as shown in FIG. 9A (a), the sensing unit 140 checks inclination information and the controller 180 then controls a bookmark menu 910 to be displayed to correspond to the checked inclination information. In particular, if a user inclines the mobile terminal 100 in the top direction, the bookmark menu window 910 including a plurality of bookmarks 911 to 913 is displayed. In doing so, the bookmark menu window 910 may be displayed like a general top view of a book. In particular, it may be able to represent a shape of a top thickness of a book though the bookmark menu window 910 as if a paper book is slightly held upward. The bookmark image 911 may be represented as a shape as if a bookmark is actually put into the top thickness of the paper book. When the bookmark menu window 910 is displayed on the touchscreen 151, the previously displayed page of the e-book content may be displayed by being reduced. The touchscreen 151 keeps being in the touch lock mode and may receive an input of a user touch action to select the $2^{nd}$ bookmark image 912 from the newly displayed bookmark images.

Referring to FIG. 9A (c), as the bookmark indicator is selected, the touch lock mode is cancelled. The previously displayed page of the e-book content is then changed into a page corresponding to the selected bookmark indicator. Hence, the touchscreen 151 is released from the touch lock mode and then displays a page related to the $2^{nd}$ bookmark.

FIG. 9B shows one example of an action of canceling a touch lock mode not by selecting one e-book content but by selecting another e-book content.

Referring to FIG. 9B (a), an e-book content of a $2^{nd}$ page 500a, which is a specific page, is displayed on the touchscreen 151 in a touch lock mode. Meanwhile, an arrow shown in FIG. 9B (a) means an action of inclining the mobile terminal 100 in bottom direction.

Referring to FIG. 9B (b), if the mobile terminal 100 is inclined in the bottom direction, as shown in FIG. 9B (a), the sensing unit 140 checks inclination information and the controller 180 then controls a bookshelf menu 930, which includes a plurality of e-book contents 931 to 934, to be displayed to correspond to the checked inclination information. In particular, if a user inclines the mobile terminal 100 in the bottom direction, the bookshelf menu window 930 is displayed on a top end of the touchscreen 151. In doing so, the touchscreen 151 keeps being in the touch lock mode. As soon as the bookshelf menu 930 is displayed on the touchscreen 151, the previously displayed page of the e-book content is displayed by being reduced in ratio. The touchscreen 151 may receive an input of a user touch action to select BOOK3 933, which is a specific e-book content, from the newly displayed bookshelf menu 930.

Referring to FIG. 9B (c), as the BOOK3 933, which is the specific e-book content, is selected, the touch lock mode is cancelled and the corresponding e-book content is displayed. Hence, the touchscreen 151 is released from the touch lock mode and then displays an e-book content 500b related to the selected BOOK3.

FIG. 9C shows another example of an action of canceling a touch lock mode by selecting a different e-book content.

Referring to FIG. 9C (a), an e-book content of a $2^{nd}$ page 500a, which is a specific page, is displayed on the touchscreen 151 in a touch lock mode. Meanwhile, in FIG. 9C (a), a touch & drag action in left-to-right direction is inputted to the touchscreen 151 by a user. It may be able to set a specific touch action to be inputtable despite the touch lock mode. According to this example, the touch & drag action is set to be exceptionally inputted to a specific position.

Referring to FIG. 9C (b), if the touch & drag action in left-to-right direction is inputted to the touchscreen 151, the controller 180 controls a bookshelf menu 960, which includes a plurality of e-book contents 961 to 963, to be displayed to correspond to the inputted touch & drag action. In particular, each of the e-book contents 961 to 963 included in the bookshelf menu 960 may display such information on the corresponding e-book content as information including a title of the corresponding e-book content, author name information and the like. In doing so, the touchscreen 151 keeps being in the touch lock mode. And, the touchscreen 151 may receive an input of a user touch action to select BOOK3 963, which is a specific e-book content, from the newly displayed bookshelf menu 960.

Referring to FIG. 9C (c), as the BOOK3 963, which is the specific e-book content, is selected, the touch lock mode is cancelled and the corresponding e-book content is displayed. Hence, the touchscreen 151 is released from the touch lock mode and then displays an e-book content 500b related to the selected BOOK3. Optionally, when the e-book content 500b related to the BOOK3 is displayed, a page previously read for the content 500b may be displayed.

Figure 10A:
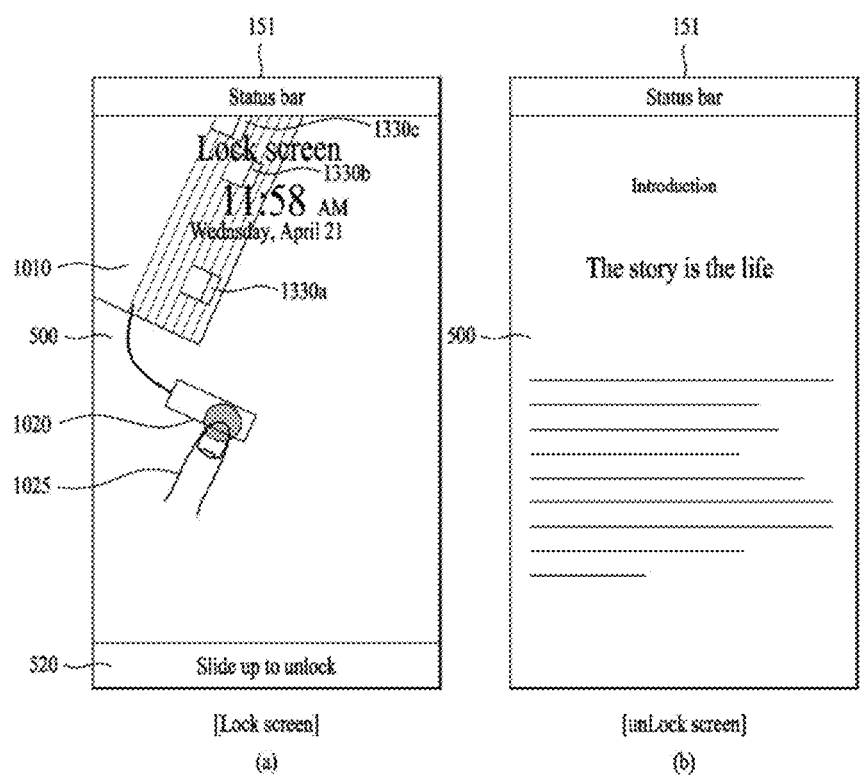
FIGS. 10A to 10C are diagrams for a $5^{th}$ example of displaying an e-book content by canceling a touch lock mode according to the present invention.
Figure 10B:
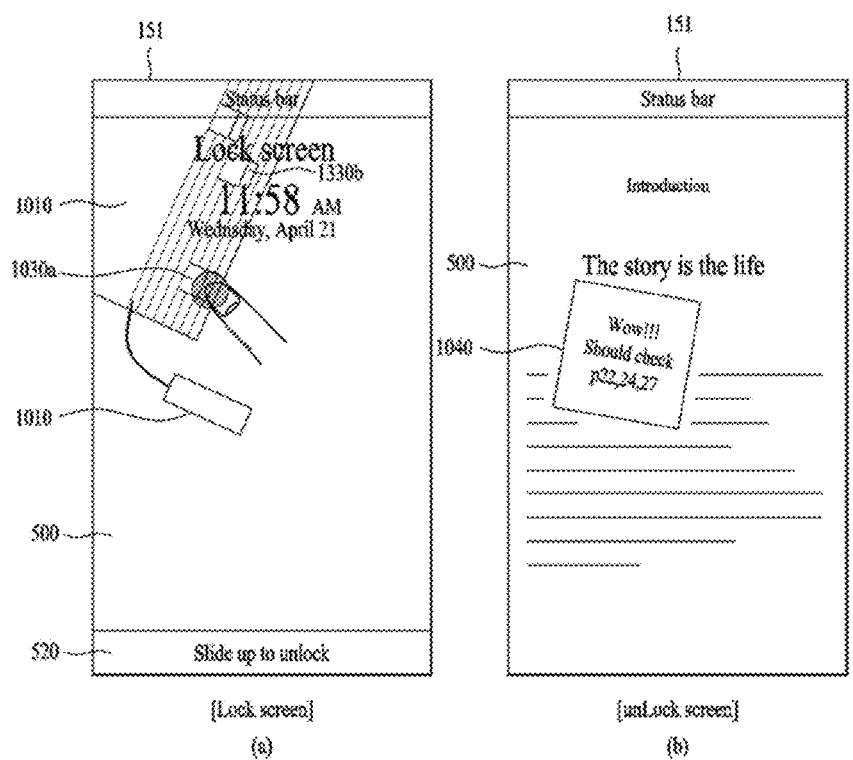
Figure 10C:
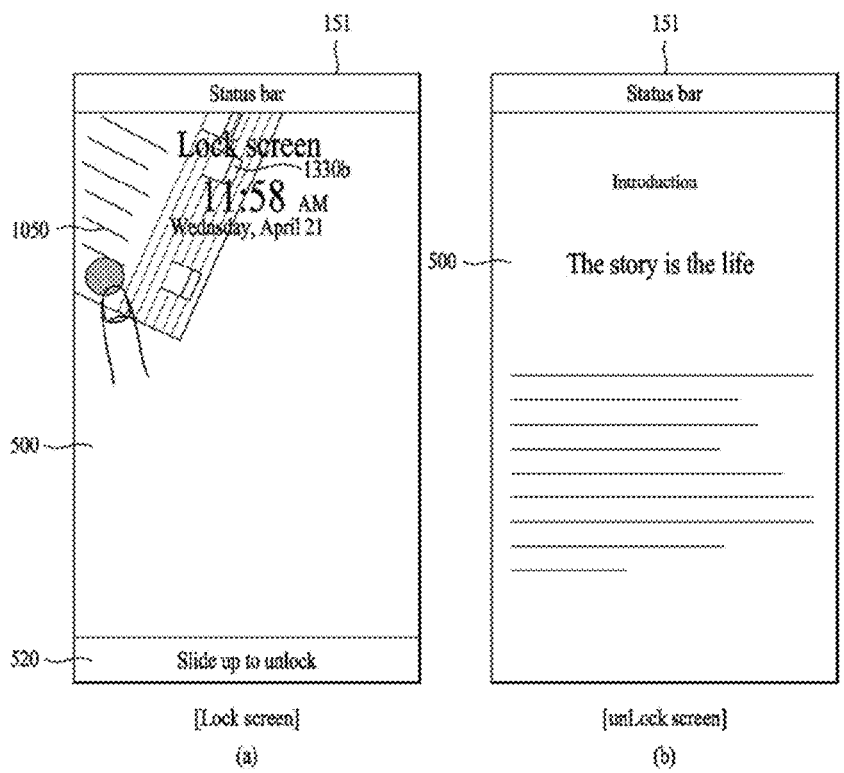

FIGS. 10A to 10C are diagrams for a $5^{th}$ example of displaying an e-book content by canceling a touch lock mode according to the present invention.

Referring to FIGS. 10A to 10C, an image of a book shape is displayed in a touch lock mode instead of a specific page of an e-book. Using the book-shape image, the touch lock mode is canceled and an e-book content may be displayed in various forms.

Referring to FIG. 10A (a), the touchscreen 151 is in touch lock mode and displays a book-shape image 1010 on a screen top end. In particular, the book-shape image 1010 may include a bookmark image 1020 and a plurality of memo images 1330a to 1330c. This book-shape image 1010, the bookmark image 1020 provided in a manner of being inserted in the book-shape image 1010 and the memo images 1330a to 1330c may visually provide an effect as if a bookmark or a memo paper is inserted in a paper book. Although the touchscreen 151 is in the touch lock mode, it may be set to allow a touch action performed on a specific region. For instance, if a touch action is performed on the bookmark image 1020 or one of the memo images 1030a to 1030c, it may be recognized as a meaningful user command despite that the touch lock mode is entered.

In the drawing, the touchscreen 151 may receive a user touch action 1025 to select the bookmark image 1020. If the bookmark image 1020 is selected, a page having the bookmark marked thereon may be displayed as if a bookmark part is selected to a real paper book. The bookmark image 1020 may be saved in advance in a manner of being linked to a specific page of a specific e-book content. For instance, the specific page linked to the bookmark image 1020 may include a page bookmarked by a user to a page on entering the touch lock mode.

Referring to FIG. 10A (b), a page related to a bookmark part is displayed on the touchscreen 151. If the bookmark image 1020 is selected, the touchscreen 151 may be released from the touch lock mode and then displays a page related to the bookmark image 1020.

Referring to FIG. 10B (a), a specific memo image 1030a is selected from a plurality of the memo images 1030a to 1030c shown in FIG. 10A (a) by a touch action. In doing so, the memo image may play a similar role as post-it that indicates a presence of a memo in a real paper book. In particular, each of the memo images 1030a to 1030c may be displayed in case that a corresponding memo written for a specific page of an e-book content by a user is saved in advance. Accordingly, if a specific one of the displayed memory images is selected by a touch action, a corresponding page may be displayed together with a corresponding memo substance.

Referring to FIG. 10B (b), a page 500 related to the selected memo image 1030a is displayed on the touchscreen 151. And, a memo 1040 related to the displayed page 500 is displayed on the touchscreen 151 together with the page 500. If a memo presence image 1030a is selected, the touchscreen 151 may be released from the touch lock mode.

Optionally, while the touch lock mode is maintained, a memo substance may be set to be displayed only. In particular, if a prescribed memo image is selected from the memo images 1030a to 1030c, the touchscreen 151 may be set to display the memo substance of the selected memo image only by maintaining the touch lock mode.

Referring to FIG. 10C (a), a book-shape image 1050 is displayed on the touchscreen 151. In doing so, the touchscreen 151 is set to enter a touch lock mode. For instance, as a touch lock prerequisite is met due to expiration of predetermined time in the course of displaying an e-book content, if the touch lock mode is entered, a book-shape image 1050 may be displayed on the touchscreen 151 in a manner that a last page of a book is open. In particular, the book-shape image 1050 is displayed to show a portion of the substance in a manner that a specific page is open. The controller 180 may control a touch action on the book-shape image 1050 to be recognized as a meaningful user command despite the touch lock mode. If a user selects an opened book leaf image of the book-shape image 1050 from the touchscreen 151, the controller 180 may control the touchscreen 151 to display a page related to the corresponding book leaf image.

Referring to FIG. 10C (b), if the book leaf image is selected, the touchscreen 151 may be released from the touch lock mode and a page related to the book leaf image is displayed. For instance, if the book-shape image 1050 is brought in by a touch & drag, the touch lock mode of the touchscreen 151 is cancelled to display the page related to the book leaf image.

According to the example shown in FIGS. 10A to 10C, when a real paper book is open, a visual effect of selecting a bookmark may be provided. And, the touchscreen 151 may be released from a touch lock mode.

Figure 11A:
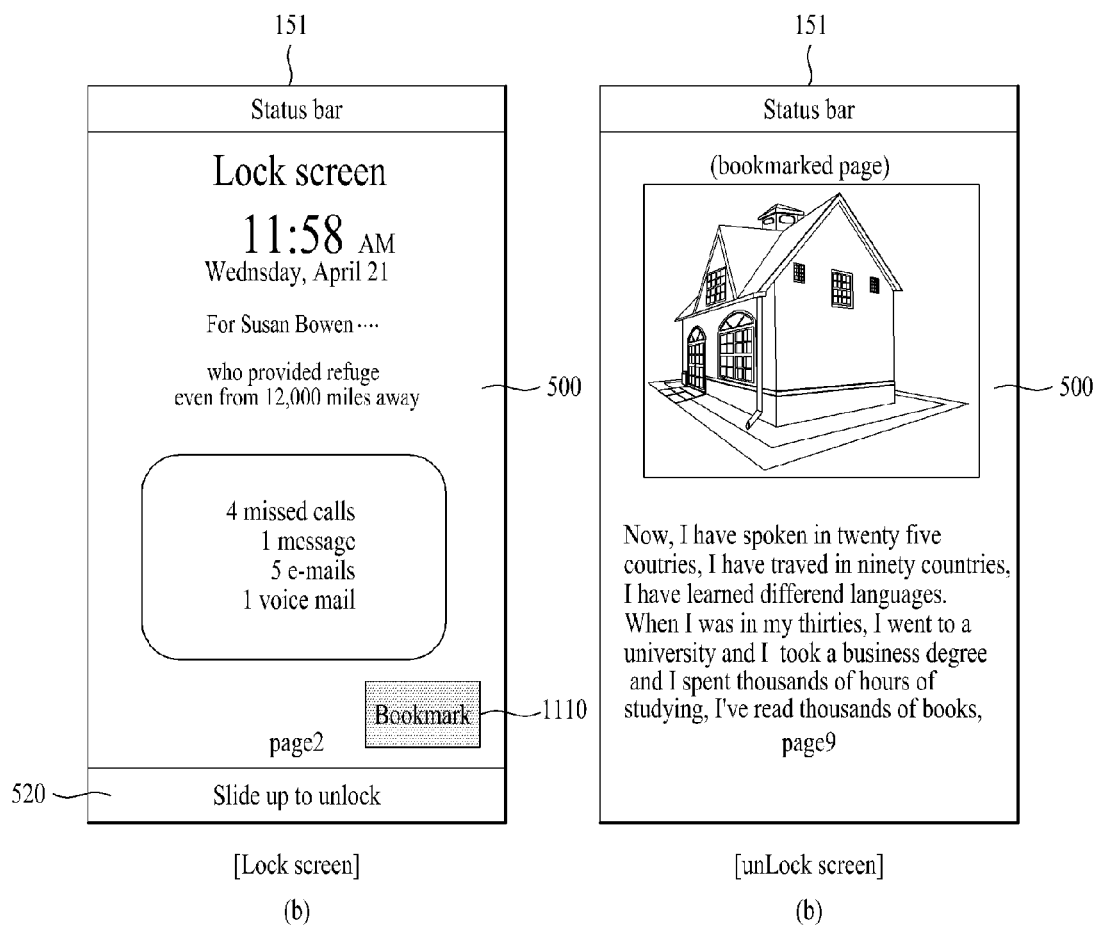
FIGS. 11A to 11C are diagrams for one example of utilizing a bookmark according to the present invention.
Figure 11B:
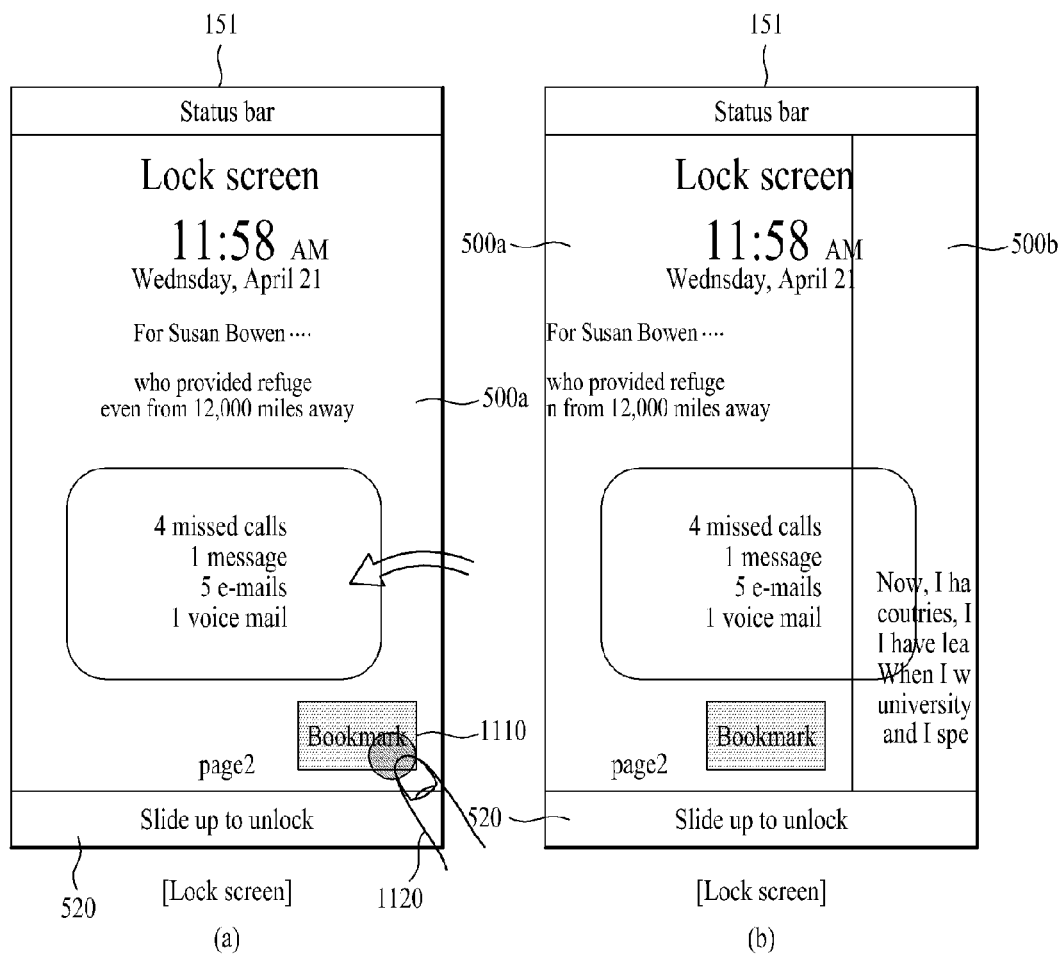
Figure 11C:
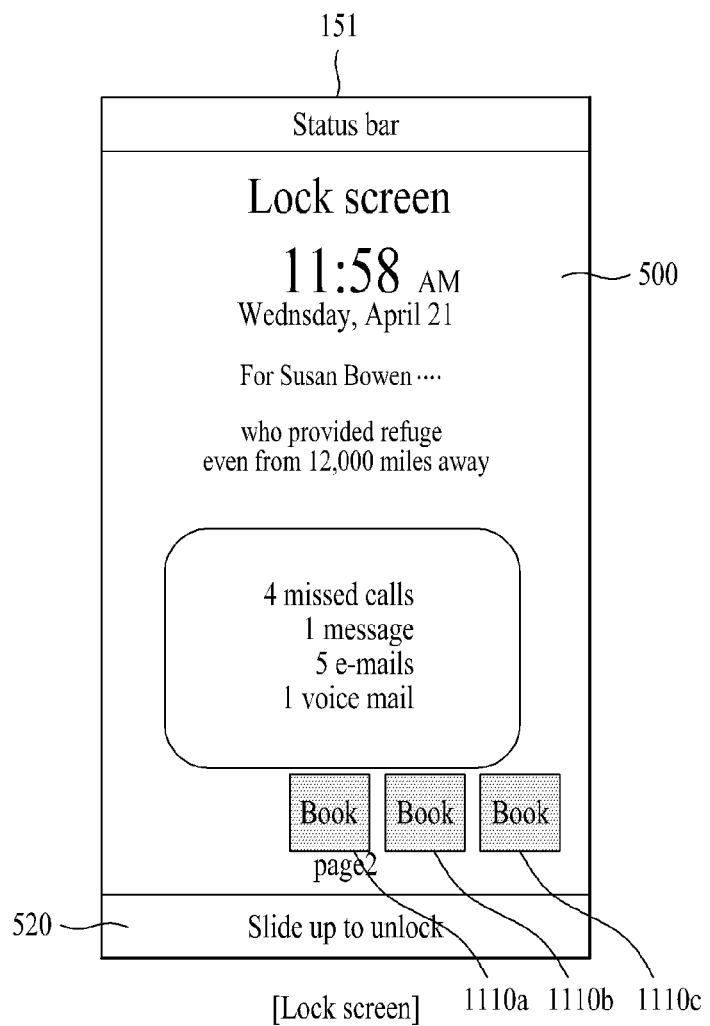

FIGS. 11A to 11C are diagrams for one example of utilizing a bookmark according to the present invention.

When an e-book function is used, it may be able to utilize a bookmark function. For instance, if a previously bookmarked page exists, it may be able to quickly go to a desired bookmarked page using the bookmark function. Hence, it may be able to quickly search for a page desired by a user using a bookmark function and the desired page may be quickly accessed.

According to the present invention, the mobile terminal 100 may provide a bookmark function. Therefore, in using an e-book, a specific page of a specific e-book content may be bookmarked. And, the bookmarked page may be saved in the memory 160. Moreover, it may be able to directly display the bookmarked page by loading the bookmark function.

FIG. 11A is a diagram for an operation of directly moving to a bookmarked page and simultaneously canceling a touch lock mode of the touchscreen 151, by selecting a bookmark menu.

Referring to FIG. 11A (a), a $2^{nd}$ page, which is a specific page of a specific e-book content, is displayed on the touchscreen 151. And, the touchscreen 151 is in touch lock mode. A specific bookmark menu 1110 is displayed on the touchscreen 151 as well. The controller 180 may be able to set a specific region as a touch receivable region in a touch lock mode. In connection with FIG. 11A, the bookmark menu 110 is set as the touch receivable region.

Referring to FIG. 11A (b), the specific bookmark menu 1110 is selected. In particular, if the specific bookmark menu 1110 is selected, $10^{th}$ page, which is a bookmarked page, is displayed on the touchscreen 151. If the touchscreen 151 may be released from the touch lock mode as soon as the bookmarked page is selected.

Referring to FIG. 11B (a), in a manner similar to that shown in FIG. 11A (a), a specific page 500a of a specific e-book content is displayed on the touchscreen 151. And, the touchscreen 151 is in touch lock mode. In doing so, the mobile terminal 100 is inclined in lateral direction as soon as a bookmark menu 1110 is selected. If the mobile terminal 100 is inclined, the sensing unit 140 may be able to sense this inclination. If both of the action of selecting the bookmark menu 1110 and the action of inclining the mobile terminal 100 are detected, the controller 180 may recognizes the detection as a command for displaying a page next to a currently displayed page among the bookmarked pages.

Referring to FIG. 11B (b), if the bookmark menu 1110 is selected and the mobile terminal 100 is inclined in lateral direction, a $2^{nd}$ page, which is a current page, and a $3^{rd}$ page, which is a next page, are displayed together. In particular, while the touchscreen 151 keeps being in the touch lock mode, when a user intends to turn a currently displayed page to a next page or view the next page slightly, if the above-mentioned action is performed, the controller 180 may be able to display the next page 500b.

Referring to FIG. 11C, a plurality of bookmark menus 1110a to 1110c are displayed on the touchscreen 151. The touchscreen 151 in a touch lock mode may be able to display a specific page 500. In doing so, while the bookmark menus are displayed, each of the bookmark menus may be linked to a bookmarked page related to the corresponding bookmark menu. Hence, if one of the bookmark menus 1110a to 1110c is selected, the touchscreen 151 may be released from the touch lock mode and then displays the page related to each of the selected menus.

Regarding FIG. 11C, as mentioned in the above description, although the bookmark menus 1110a to 1110c are linked to the bookmarked pages, respectively, each of the bookmark menus 1110a to 1110cs may be related to a page or e-book content which is being read by a user. For instance, when a user simultaneously opens and reads a plurality of e-book contents not in a touch lock mode but in a normal mode using an e-book application, if the touch lock mode is entered, book icons may be created as many as the number of the opened e-book contents. And, each of the book icons may be related to the corresponding opened e-book content. These book icons may be displayed on the touchscreen 151 in a manner similar to that of the bookmark menus 1110a to 1110c shown in FIG. 11C. Therefore, in the touch lock mode, a mode for reading the previously read e-book content again may be entered as soon as the touch lock mode is cancelled by a selection of a specific one of a plurality of the book icons despite the touch lock mode.

The present invention may apply to a case of web browser. For instance, when internet is performed via web browser, if a touch lock mode is entered, a shortcut icon for the corresponding web browser is created and displayed. In particular, if the shortcut icon is selected in the touch lock mode, the touch lock mode is cancelled and the previously used web browser may be reopened.

FIG. 12 is a diagram for one example of setting a bookmark and utilizing the bookmark in a touch lock mode according to the present invention.

Referring to FIG. 12, in case that the touchscreen 151 enters a touch lock mode, it may be set to display a bookmarked page in a different way using a bookmark function.

Referring to FIG. 12 (a), the touchscreen 151 may be able to freely receive a touch action in a mode that is not a touch lock mode. The touchscreen 151 displays a $2^{nd}$ page 500a of an e-book content. In this status, it may be able to bookmark a currently displayed page using a user's touch action 1210. In doing so, the currently displayed page may be bookmarked in various ways. In the drawing, for example, it may be able to bookmark the current page 500 by an action performed as if the displayed page is folded. The $2^{nd}$ page 500a, which is the currently displayed page, is saved as a bookmarked page in the memory 160.

Referring to FIG. 12 (b), the touchscreen 151 enters the touch lock mode separately from the bookmarked page. If a touch lock prerequisite is met (e.g., a predetermined time is over without a touch action), the touchscreen 151 enters the touch lock mode. When the touch lock mode is entered, a $3^{rd}$ page 500b among a plurality of pages constructing the e-book content is displayed on the touchscreen 151.

Referring to FIG. 12 (c), the touchscreen 151 is in the touch lock mode. When the touchscreen enters the touch lock mode, it may display an e-book content. In doing so, the $2^{nd}$ page 500a bookmarked in FIG. 12 (a) is displayed instead of the $3^{rd}$ page 500b that is the last page on entering the touch lock mode. Compared to the case shown in FIG. 5A, in which the page of the e-book content displayed on entering the touch lock mode is displayed in the touch lock mode, FIG. 12 (c) shows that the bookmarked page of the e-book content is displayed on the touchscreen 151 in the touch lock mode.

FIG. 13 is a diagram for one example of an action of controlling an e-book content in a touch lock mode according to the present invention.

Referring to FIG. 13 (a), an e-book content is displayed on the touchscreen 151 in a touch lock mode. In particular, the e-book content may be displayed on the touchscreen 151 in a different manner that pages of the e-book content are slightly open. In the drawing, $1^{st}$ page 500a, $2^{nd}$ page 500b and $3^{rd}$ page 500c constructing the e-book content are displayed in a manner of being slightly opened. Despite that the touch lock mode is entered, a touch action of selecting the page may be set to be recognized as a meaningful touch action by the touchscreen 151. In this case, a full page currently displayed is the $1^{st}$ page 500a. And, each of the $2^{nd}$ page 500b and the $3^{rd}$ page 500c may be displayed as if blocked by the $1^{st}$ page 500a. In this display situation, if a touch action of selecting the blocked $2^{nd}$ page 500b is inputted to the touchscreen 151, it may be able to set the touchscreen 151 to fully display the $2^{nd}$ page 500.

Referring to FIG. 13 (b), if a touch action of selecting the $2^{nd}$ page 500b is performed, the $1^{st}$ page 500 used to block the $2^{nd}$ page 500b is displayed in a manner of being turned. Referring to FIG. 13 (c), the $2^{nd}$ page 500b is fully displayed on the touchscreen 151.

The present invention may be provided with a function of shifting a page of an e-book content displayed on the touchscreen 151 despite that a touch lock mode is maintained.

FIG. 14 is a diagram for another example of an action of controlling an e-book content in a touch lock mode according to the present invention.

The mobile terminal 100 according to the present invention may include a function of adding a memo to an e-book content in providing an e-book function. In particular, when a user intends to add a specific memo for a specific page of an e-book content, if the user adds the specific memo to the corresponding page, the corresponding memo for the corresponding page may be saved in the memory 160.

Referring to FIG. 14 (a), the touchscreen 151 is in a touch lock mode. Various information indicating the entered touch lock mode and a specific page 500 of an e-book content are displayed on the touchscreen 151. Moreover, a memo menu 1410 for adding a memo may be further displayed on the touchscreen 151. Despite the entered touch lock mode, a user's touch action on the menu memo 1410 may be set as a meaningful touch action. If the menu memo 1410 is selected by a user's touch action 1420, the controller 180 may be able to activate a memo application.

Referring to FIG. 14 (b), after the memo application has been activated by selecting the menu memo 1410, a memo substance may be inputted. In the drawing, although the touch lock mode is maintained, if the memo menu 1410 is selected, the touchscreen 151 may recognize the user's touch action as a user action to input the memo substance temporarily. In the drawing, a specific memo substance 'OK' is inputted to the touchscreen 151 by a user's touch action. Optionally, if the memo menu 1410 is selected, it may be able to set the touch lock mode to be temporarily canceled.

Referring to FIG. 14 (c), if the memo substance is inputted, the inputted memo substance may be displayed on a memo window 1450. While a specific page 500 is displayed, if a memo substance is inputted, both of the specific page 500 and the memo window 1450 including the memo substance may be displayed in association with each other.

Meanwhile, if a memo writing action of a user is completed, it may go back to the status shown in FIG. 10A (a). Hence, it may be able to indicate that the memo substance is present like one of the memo images 1030a to 1030c shown in FIG. 10A (a).

FIG. 15 is a diagram for an action of ending an e-book content display according to the present invention.

According to the above-mentioned description, an e-book content is displayed in touch lock mode. And, the touch lock mode is canceled. Yet, it may not be necessary to display an e-book content in a touch lock mode. In accordance with a selection made by a user, the e-book content may stop being displayed. Hence, in the following description, explained is an action of activating an e-book content display by maintaining a touch lock mode.

Referring to FIG. 15 (a), while a touch lock mode is maintained, a specific page of an e-book content is displayed. In this status, the touchscreen 151 may receive a long touch & drag action 1510 in left-to-right direction. If the touchscreen 151 receives the long touch & drag action 1510, the controller 180 may recognize the received user action as a user command to end the e-book content display. Yet, the long touch & drag action 1510 may be just exemplary. Optionally, in accordance with user settings or manufacturer settings, various kinds of user actions may be set as the action to end the e-book content display.

Referring to FIG. 15 (b), if the input of the long touch & drag action 1510 is received, an operation of ending the display of the e-book content is displayed on the touchscreen 151. In particular, the touchscreen 151 may display an effect that a cover page of the e-book content displayed on the touchscreen 151 is closed in a similar manner that a cover page of a real paper book is closed. This operation is set to be consecutively performed, whereby a user can be clearly aware of the end of the e-book content display.

Referring to FIG. 15 (c), in accordance with the long touch & drag action 1510, the display operation of the e-book content is ended and a status of the mobile terminal 100 returns to a normal touch lock mode.

In the above description, the present invention is explained in connection with an e-book application, by which the present invention may be non-limited in association with a touch lock mode. And, the present invention may apply to a case that a touch lock mode is entered in the course of activating a different application. For instance, in case that a touch lock mode is entered in the course of activating a web browser application, a content of a most recently displayed web browser may be displayed.

According to one embodiment of the present invention, the above-described image displaying methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The above-described mobile terminal may be achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

Accordingly, the present invention provides the following effects and/or advantages.

First of all, a mobile terminal according to at least one embodiment of the present invention may keep displaying a previously displayed e-book content in a touch lock mode.

Secondly, a mobile terminal according to at least one embodiment of the present invention may display an e-book content in a desired status in case of canceling a touch lock mode.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal comprising:
    displaying a first specific page of e-book content comprising a plurality of pages on a touchscreen that is in a touch unlock mode;
    causing the touchscreen, on which the first specific page is displayed, to enter a touch lock mode;
    displaying the first specific page on the touchscreen that entered the touch lock mode; and
    causing the touchscreen to exit the touch lock mode and display a next or previous page of the e-book content in response to receiving a drag input in a first direction at the touchscreen that is in the touch lock mode.

2. The method of claim 1, further comprising:
    displaying a memo icon on the touchscreen while the touchscreen is in the touch lock mode;
    activating a memo application in response to receiving a touch input selecting the memo icon via the touchscreen;
    receiving a handwriting touch input via the touchscreen to the memo application for drawing a handwriting object; and
    displaying the handwriting object with a path of the handwriting touch input on the first specific page of the e-book content.

3. The method of claim 1, wherein the touchscreen enters the touch lock mode when not receiving an input of a touch action for a threshold time duration during the touch unlock mode or when receiving a user command to lock the touchscreen.

4. The method of claim 1 further comprising, displaying the next page or the previous page in response to a tilt of the mobile terminal in a specific direction while the touchscreen is in the touch lock mode.

5. The method of claim 1, further comprising:
displaying event information on the touchscreen while the touchscreen is in the touch lock mode, the displayed event information overlapping the displayed first specific page, wherein the event information comprises at least message caption information, call reception information, or email reception information.

6. The method of claim 1, further comprising continuing the displaying of the first specific page on the touchscreen in the touch lock mode in response to receiving a drag input in a second direction at the touchscreen that is in the touch lock mode.

7. The method of claim 1, further comprising:
displaying a specific indicator corresponding to a second specific page of the e-book content while the touchscreen is in the touch lock mode;
causing the touchscreen to exit the touch lock mode in response to receiving the drag input selecting the specific indicator; and
displaying the second specific page after the exiting of the touch lock mode.

8. The method of claim 7, wherein the second specific page corresponds to at least one of a particular page of the e-book content, the next page, or the previous page.

9. The method of claim 7, wherein the second specific page corresponds to a bookmarked page of the e-book content.

10. The method of claim 6, wherein the first direction is perpendicular to the second direction.

11. The method of claim 6, further comprising displaying information other than the first specific page on the touchscreen that is displaying the first specific page in the touch lock mode.

12. The method of claim 11, wherein the drag input in the second direction is received while the information and the first specific page are displayed on the touchscreen that is in the touch lock mode.

13. The method of claim 12, further comprising causing the touchscreen to not display the information when the first specific page is continuously displayed on the touchscreen in the touch lock mode in response to the drag input in the second direction.

14. A mobile terminal comprising:
a touchscreen; and
a controller configured to:
cause the touchscreen to display a first specific page of e-book content comprising a plurality of pages while the touchscreen is in a touch unlock mode;
cause the touchscreen, on which the first specific page is displayed, to enter a touch lock mode;
cause the touchscreen that entered the touch lock mode to display the first specific page; and
cause the touchscreen to exit the touch lock mode and display a next or previous page of the e-book content in response to receiving a drag input in a first direction at the touchscreen that is in the touch lock mode.

15. The mobile terminal of claim 14, wherein the controller is further configured to cause the touchscreen to continue the displaying of the first specific page on the touchscreen in the touch lock mode in response to receiving a drag input in a second direction at the touchscreen that is in the touch lock mode.

16. The mobile terminal of claim 14, wherein the touchscreen enters the touch lock mode when not receiving an input of a touch action for a threshold time duration during the touch unlock mode or when receiving a user command to lock the touchscreen.

17. The mobile terminal of claim 14, wherein the controller is further configured to:
cause the touchscreen to display a memo icon while the touchscreen is in the touch lock mode;
activate a memo application in response to receiving a touch input selecting the memo icon via the touchscreen;
receive a handwriting touch input via the touchscreen to the memo application for drawing a handwriting object; and
cause the touchscreen to display the handwriting object with a path of the handwriting touch input on the first specific page of the e-book content.

18. The mobile terminal of claim 14, wherein the controller is further configured to:
cause the touchscreen to display the next or the previous page in response to tilting of the mobile terminal in a specific direction while the touchscreen is in the touch lock mode.

19. The mobile terminal of claim 14, wherein the controller is further configured to:
cause the touchscreen to display a specific indicator corresponding to a second specific page of the e-book content while the touchscreen is in the touch lock mode;
cause the touchscreen to exit the touch lock mode in response to the drag input selecting the specific indicator; and
cause the touchscreen to display the second specific page after the exiting of the touch lock mode.

20. The mobile terminal of claim 19, wherein the second specific page corresponds to at least one of a particular page of the e-book content, the next page, or the previous page.

* * * * *